(12) United States Patent
Lee et al.

(10) Patent No.: US 12,335,958 B2
(45) Date of Patent: *Jun. 17, 2025

(54) REFERENCE SIGNAL DESIGN FOR WIRELESS COMMUNICATION SYSTEMS

(71) Applicant: InterDigital Patent Holdings, Inc., Wilmington, DE (US)

(72) Inventors: Moon-il Lee, Melville, NY (US); Erdem Bala, East Meadow, NY (US); Janet A. Stern-Berkowitz, Little Neck, NY (US); Mihaela C. Beluri, Jericho, NY (US); Alphan Sahin, Westbury, NY (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,570

(22) Filed: Mar. 7, 2024

(65) Prior Publication Data
US 2024/0215034 A1  Jun. 27, 2024

Related U.S. Application Data

(63) Continuation of application No. 18/142,342, filed on May 2, 2023, now Pat. No. 11,963,175, which is a
(Continued)

(51) Int. Cl.
*H04W 72/21* (2023.01)
*H04L 5/00* (2006.01)
(Continued)

(52) U.S. Cl.
CPC ............. *H04W 72/21* (2023.01); *H04L 5/001* (2013.01); *H04L 5/0048* (2013.01); *H04L 27/261* (2013.01); *H04W 4/70* (2018.02)

(58) Field of Classification Search
CPC ........ H04W 72/21; H04W 4/70; H04L 5/001; H04L 5/0048; H04L 27/261;
(Continued)

(56) References Cited

U.S. PATENT DOCUMENTS 7,822,069 B2   10/2010  Medvedev et al.
9,800,368 B2   10/2017  Sun et al.
(Continued)

FOREIGN PATENT DOCUMENTS

CN   103220795 A   7/2013
CN   104980247 A   10/2015
(Continued)

OTHER PUBLICATIONS

NPL: Study of phase noise tracking, by Intel (Year: 2016).*
(Continued)

*Primary Examiner* — Ayanah S George
(74) *Attorney, Agent, or Firm* — Flaster Greenberg, P.C.

(57) ABSTRACT

Systems, methods, and instrumentalities are disclosed for phase noise reference signal (PNRS) transmission, comprising receiving, at a wireless transmit receive unit (WTRU), scheduling information for a Physical Uplink Shared Channel (PUSCH) transmission, wherein the scheduling information includes an indication of a set of physical resource blocks (PRBs) and a modulation coding scheme (MCS) level, determining a density for the PNRS transmission based on at least one of: the MCS level, a frequency band for the PUSCH transmission, or a subcarrier spacing of the PUSCH transmission, and transmitting the PUSCH in the scheduled set of PRBs using the determined density of PNRS.

14 Claims, 23 Drawing Sheets

Related U.S. Application Data continuation of application No. 17/902,098, filed on Sep. 2, 2022, now Pat. No. 11,678,329, which is a continuation of application No. 16/337,774, filed as application No. PCT/US2017/053980 on Sep. 28, 2017, now Pat. No. 11,477,813.

(60) Provisional application No. 62/556,146, filed on Sep. 8, 2017, provisional application No. 62/519,424, filed on Jun. 14, 2017, provisional application No. 62/454,617, filed on Feb. 3, 2017, provisional application No. 62/400,925, filed on Sep. 28, 2016.

(51) Int. Cl.
*H04L 27/26* (2006.01)
*H04W 4/70* (2018.01)

(58) Field of Classification Search
CPC ... H04L 1/0003; H04L 5/0007; H04L 5/0094; H04L 27/2636
See application file for complete search history.

(56) References Cited

U.S. PATENT DOCUMENTS

| | | | |
|---|---|---|---|
| 10,439,663 B2 | 10/2019 | Islam et al. | |
| 2009/0196366 A1* | 8/2009 | Shen | H04L 5/0053 375/260 |
| 2010/0316156 A1 | 12/2010 | Higuchi et al. | |
| 2012/0294272 A1 | 11/2012 | Han et al. | |
| 2012/0327884 A1 | 12/2012 | Seo et al. | |
| 2014/0269520 A1 | 9/2014 | Yi et al. | |
| 2015/0230211 A1 | 8/2015 | You et al. | |
| 2017/0294926 A1* | 10/2017 | Islam | H04B 1/1027 |

FOREIGN PATENT DOCUMENTS

| | | |
|---|---|---|
| JP | 2013070355 A | 4/2013 |
| JP | 2016-517200 A | 6/2016 |
| RU | 2433552 C2 | 11/2011 |
| WO | WO 2017176602 A1 | 10/2017 |

OTHER PUBLICATIONS

R1-1608781, "Discussion on Phase Noise Compensation RS for NR", CATT, 3GPP TSG RAN WG1 Meeting #86bis, Lisbon, Portugal, Oct. 10-14, 2016, 2 pages.

R1-166562, "Study of Phase Noise Tracking", Intel Corporation, 3GPP TSG-RAN WG1#86, Gothenburg, Sweden, Aug. 22-26, 2016, 7 pages.

R1-167079, "Frame structure and DMRS positions", 3GPP TSG-RAN WG1 #86; Ericsson; Gothenburg, Sweden, Aug. 22-26, 2016, 6 pages.

R1-167106, "Phase Noise Measurement/Modeling and LLS for High Frequency Numerology", CMCC, 3GPP TSG RAN WG1 Meeting #86bis, Göteborg, Sweden, Aug. 22-26, 2016, pp. 1-12.

R1-167204, "Discussion on Reference Signal Design", Huawei, HiSilicon, 3GPP TSG-RAN WG1 #86, Gothenburg, Sweden, Aug. 22-26, 2016, 4 pages.

R1-167290, "Reference Symbols Types in NR", Nokia, Alcatel-Lucent Shanghai Bell, 3GPP TSG-RAN WG1 #86, Gothenburg, Sweden, Aug. 22-26, 2016, 3 pages.

R1-167888, "Study of phase noise tracking", 3GPP TSG-RAN WG1 #86; Intel Corporation; Gothenburg, Sweden, Aug. 22-26, 2016, 9 pages.

R1-1714257, "On Details on PT-RS Design for CP-OFDM", Nokia, Nokia Shanghai Bell, 3GPP TSG RAN WG1 #90, Prague, Czech Republic, Aug. 21-25, 2017, 5 pages.

R1-1715205, "Summary of PTRS Way Forwards and Offline Discussions", Ericsson, 3GPP TSG-RAN WG1 #90, Prague, Czech Republic, Aug. 21-25, 2017, pp. 1-4.

* cited by examiner

PTRS

REFERENCE SIGNAL DESIGN FOR WIRELESS COMMUNICATION SYSTEMS

CROSS-REFERENCE TO RELATED APPLICATIONS

This application is a continuation of U.S. Non-Provisional application Ser. No. 18/142,342, filed May 2, 2023, which is a continuation of U.S. Non-Provisional application Ser. No. 17/902,098, filed Sep. 2, 2022, which issued as U.S. Pat. No. 11,678,329 on Jun. 13, 2023, which is a continuation of U.S. Non-Provisional application Ser. No. 16/337,774, filed Mar. 28, 2019, which issued as U.S. Pat. No. 11,477,813 on Oct. 18, 2022, which is the National Stage entry under 35 U.S.C. § 371 of Patent Cooperation Treaty Application PCT/US2017/053980, filed Sep. 28, 2017, which claims priority to, and the benefit of, U.S. Provisional Application No. 62/556,146, filed Sep. 8, 2017, U.S. Provisional Application No. 62/519,424, filed Jun. 14, 2017, U.S. Provisional Application No. 62/454,617, filed Feb. 3, 2017, and U.S. Provisional Application No. 62/400,925, filed Sep. 28, 2016, which are hereby incorporated by reference herein as if reproduced in their entireties.

BACKGROUND

3GPP is working on an advanced wireless communication system, which may be referred to as New Radio (NR). Applications of NR may be summarized under certain categories which may include one or more of the following: Enhanced mobile broadband (eMBB), Massive machine-type communications (mMTC), or and Ultra-reliable-and-low-latency communications (URLLC). Under a category, there may be a wide set of applications that are considered for various needs and deployment scenarios that may mandate specific performance requirements. For example, mMTC and URLLC applications may range from automotive to health, agriculture, utilities, and logistics industries.

For mMTC applications, it is expected that the system may be able to support up to 1 Million mMTC devices per Km$^2$ with extended coverage, low power consumption, and/or low device complexity. To support high connection density, non-orthogonal multiple access techniques may be proposed for NR. For URLLC applications, the WTRU density per cell may be (e.g., significantly) less. A target delay of <1 ms and/or a high reliability of 10-5 bit error rate may be targets for URLLC.

SUMMARY

Systems, methods, and instrumentalities are disclosed for phase noise reference signal (PNRS) transmission, comprising receiving, at a wireless transmit receive unit (WTRU), scheduling information for a Physical Uplink Shared Channel (PUSCH) transmission, wherein the scheduling information includes an indication of a set of physical resource blocks (PRBs) and a modulation coding scheme (MCS) level, determining a density for the PNRS transmission based on at least one of: the MCS level, a frequency band for the PUSCH transmission, or a subcarrier spacing of the PUSCH transmission, and transmitting the PUSCH in the scheduled set of PRBs using the determined density of PNRS.

BRIEF DESCRIPTION OF THE DRAWINGS

A more detailed understanding may be had from the following description, given by way of example in conjunction with the accompanying drawings.

DESCRIPTION

Figure 1A:
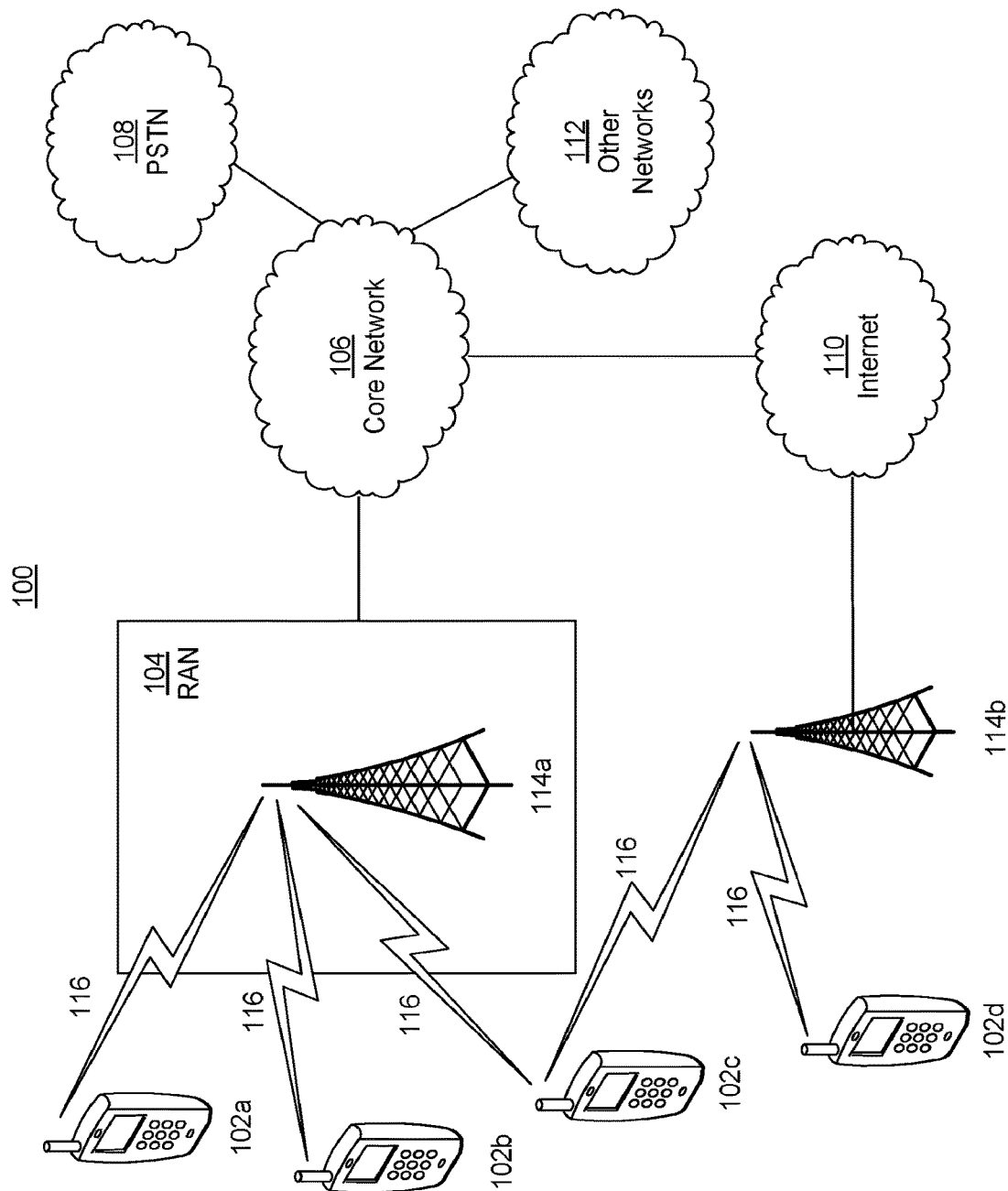
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
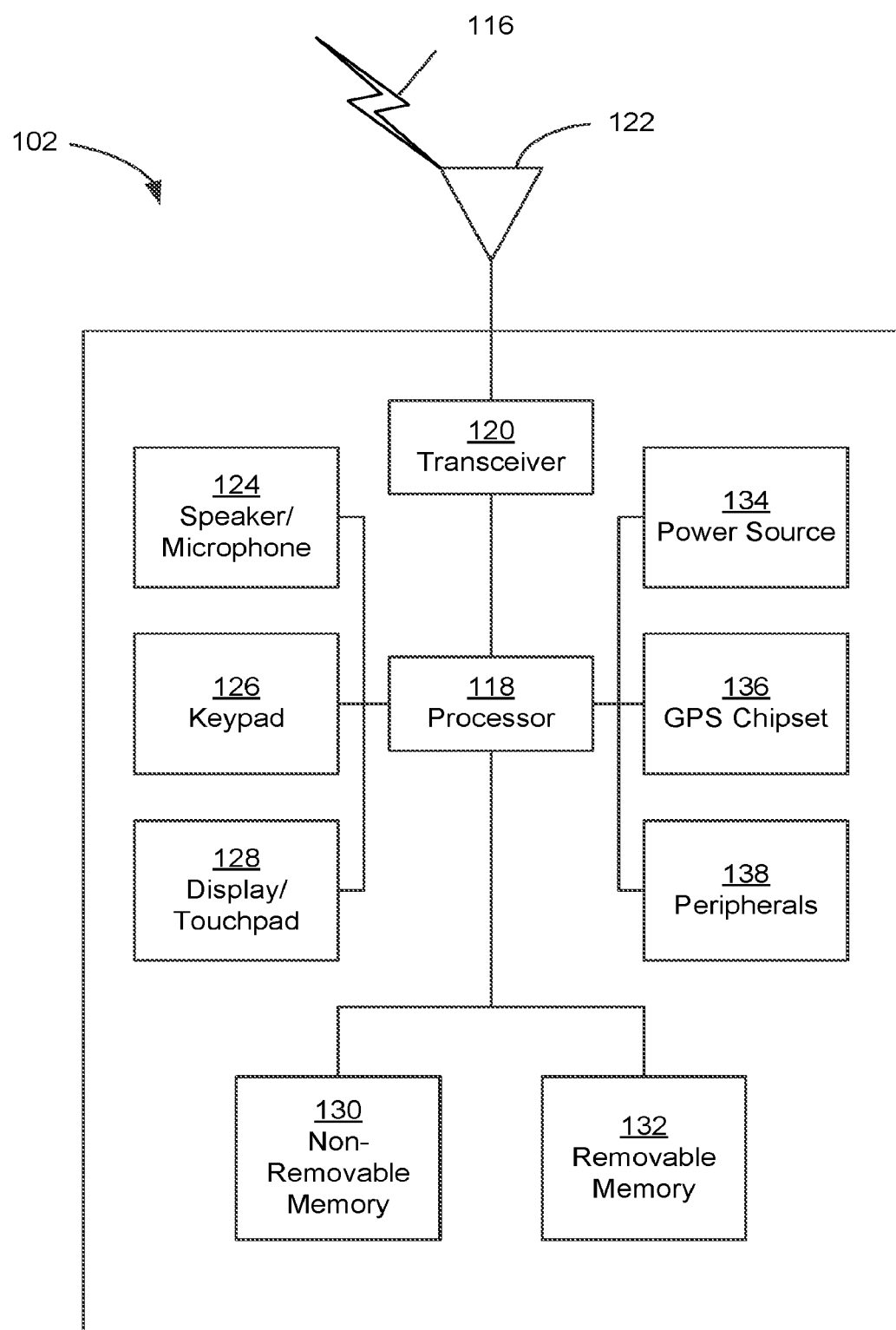
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
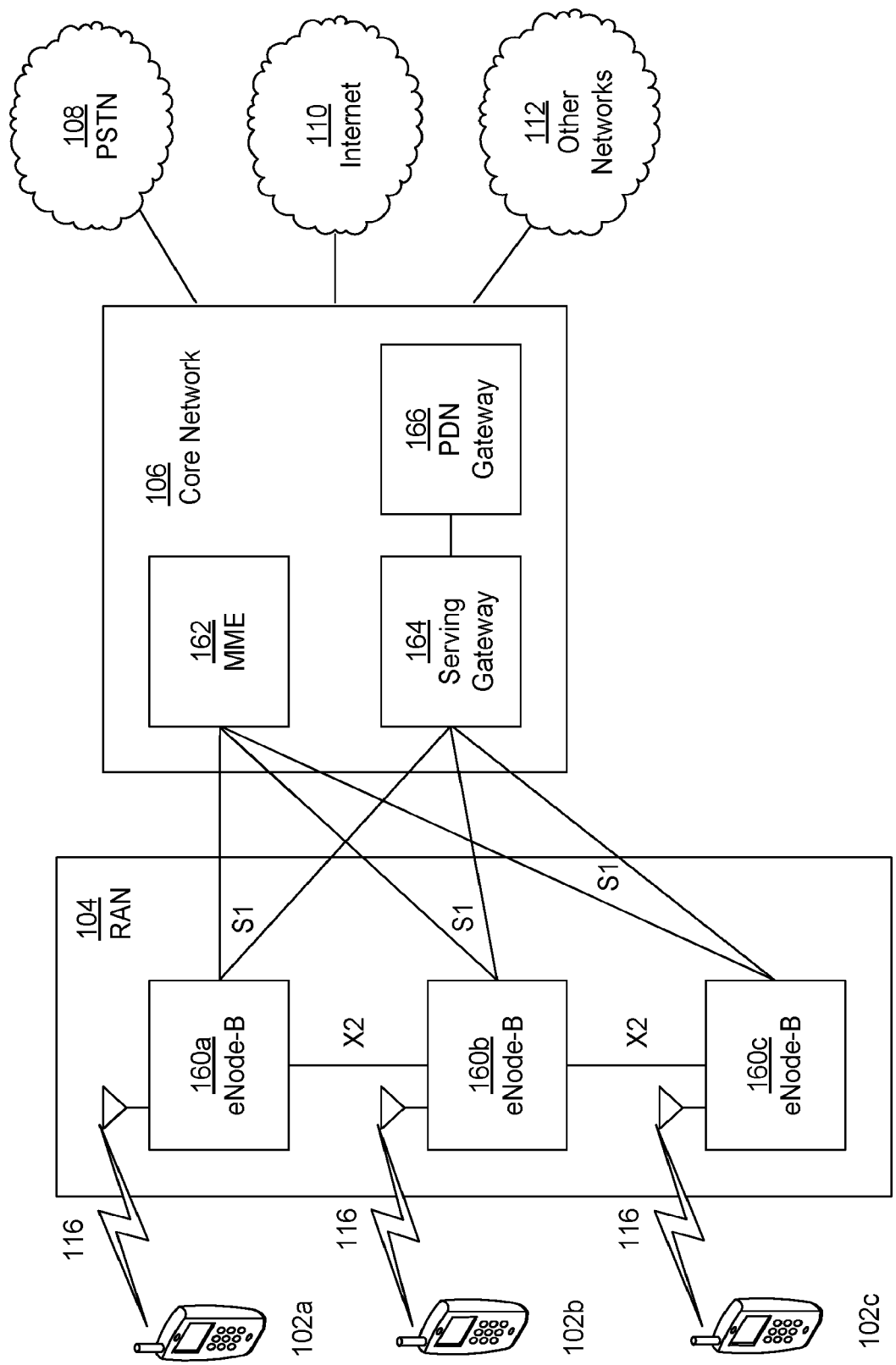
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
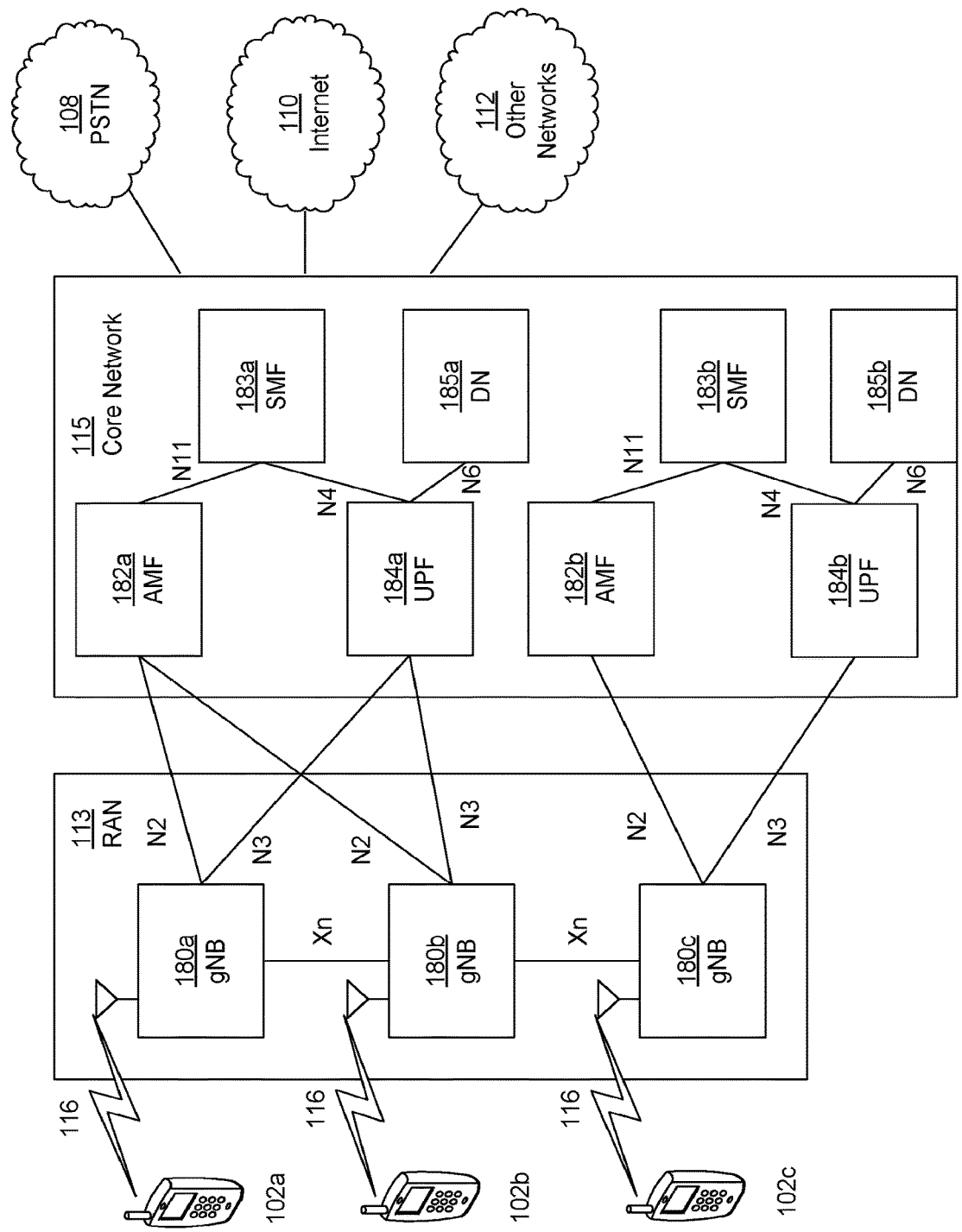
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In LTE as an example, orthogonal frequency division multiplexing (OFDM) may be used for downlink (DL) transmission and/or discrete-Fourier-transform spread OFDM (DFT-s-OFDM) may be used for uplink (UL) transmission. In Cyclic Prefix (CP) DFT-s-OFDM (sometimes referred to as single carrier (SC) SC-FDMA with multiple accessing), the data symbols may be first spread with a DFT block, and then mapped to the corresponding inputs of an IDFT block. The CP may be prepended to the beginning of the symbol in order to avoid inter-symbol interference (ISI) and allow one-tap frequency domain equalization (FDE) at the receiver.

In downlink transmission, reference symbols may be scattered over specific subcarriers, e.g., one OFDM symbol has subcarriers loaded with data and reference symbols. Common reference symbols may be transmitted on subcarriers distributed over the system bandwidth and/or WTRU-specific reference signals may be distributed over the subband that is allocated to a specific WTRU.

For the next generation of wireless communication systems, reference signal design may be needed to address phase noise problems that may occur when operating in the high frequency bands. For high mobility scenarios, enhancements of RS design may be needed, e.g., to estimate and compensate the Doppler shift. It may be desirable to have a common uplink/downlink/sidelink RS design, with low overhead.

Systems, methods, and instrumentalities are disclosed, for example, to transmit a DL signal from multiple TRPs with phase noise reference signal (PNRS). PNRS design/configuration, use of PNRS with multiple TRPs, and PNRS for UL transmission are disclosed.

Assuming x is the OFDM symbol after the IFFT (e.g., without CP), $\theta_t$ is the transmitter phase noise vector, the received signal after CP removal may be written as $r=\{x \odot \theta_t\} \circledast h$.

After the DFT operation at the receiver, $v=\{d \circledast \Theta_t\} \odot H$, where $\Theta_t = F\theta_t$ and $=Fh$. This means the data vector may be circularly convolved with the phase noise spectrum and the result may be scaled by the channel response. Depending on the spectrum of the phase noise, data symbol per subcarrier may be rotated with a common phase error and contaminated by inter-carrier interference. The PSD of the phase noise may be fast decaying, and, the ICI contribution may be mostly from the adjacent subcarriers. If there is a receiver phase noise, then $v=\Theta_r\{\{d \circledast \Theta_t\} \odot H\}$ where $\Theta_r$ is the spectrum of the receiver phase noise.

A reference signal may be used to compensate the phase noise and the reference signal may be transmitted over consecutive OFDM symbols in a subframe (or TTI), this may accurately estimate time-variant phase noise. One or more of following may apply: a reference signal used to compensate the phase noise may be referred to as phase noise reference signal (PNRS) (the PNRS may, for example, be interchangeably used with phase tracking reference signal (PTRS), phase noise compensation reference signal (PN-CRS), and phase error tracking reference signal (PETRS)); the phase noise reference signal may be used to estimate phase noise, and, it may be used for other purposes including one or more of time and/or frequency offset tracking, synchronization, measurement (e.g., RSRP), CSI estimation (e.g., CQI, PMI), or demodulation of a downlink signal; or the PNRS may be transmitted in one or more subcarriers in an OFDM symbol and the same subcarriers may be used in consecutive OFDM symbols within a time window (e.g., see FIGS. 2 and 3 as examples).

In a case where the PNRS is transmitted in one or more subcarriers in an OFDM symbol and the same subcarriers may be used in consecutive OFDM symbols within a time window, one or more of the following may apply. The one or more subcarrier indices which may be used for PNRS transmission may be determined based on at least one system parameter (e.g., physical cell-ID, virtual cell-ID, TRP ID, subframe number, and/or radio frame number), and, PNRS collision between neighboring cells may be avoided. The one or more time/frequency resources for PNRS which may be associated with another cell or TRP may be muted, reserved, or unused for downlink signal transmission. A subband (e.g., 12 subcarriers) may be reserved for a PNRS transmission and at least one subcarrier in the subband may be selected, determined, or used for a PNRS transmission based on at least one system parameter. The subband may not be used for other downlink signal transmissions (e.g., control, data, and/or broadcasting). The one or more subcarrier indices which may be used for PNRS transmission may be predefined. For example, a center subcarrier in a system bandwidth may be used for PNRS transmission. The number of subcarriers used for PNRS transmission may be indicated from a broadcasting signal. The one or more subcarrier indices may be the subcarrier index within a PRB which may be one of the scheduled PRBs and carry PNRS.

Figure 2:
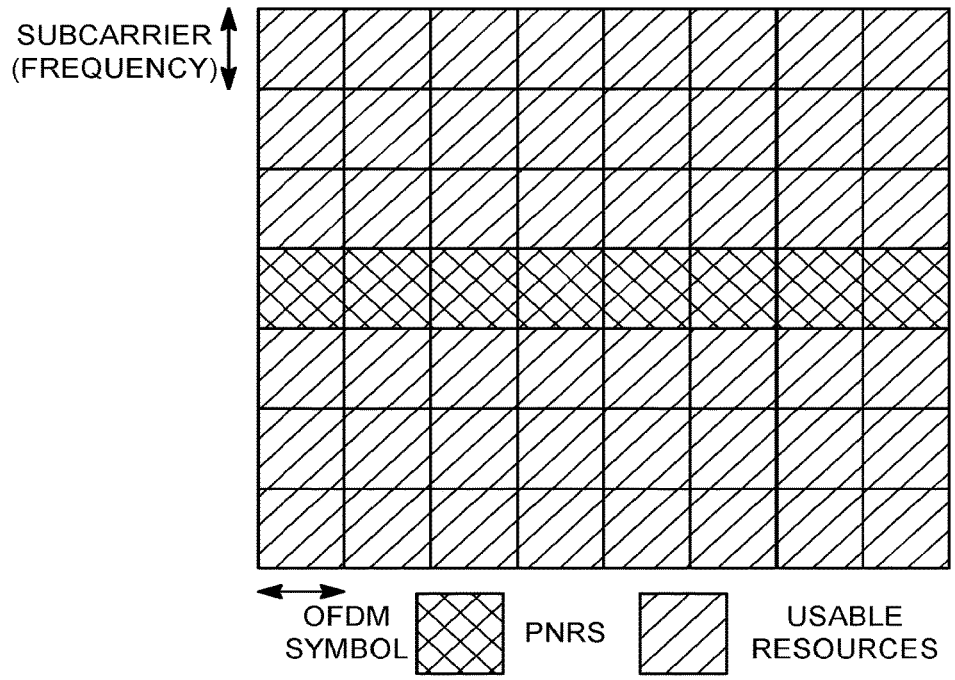
FIG. 2 illustrates an example of PNRS using a same subcarrier location over consecutive OFDM symbols.
Figure 3:
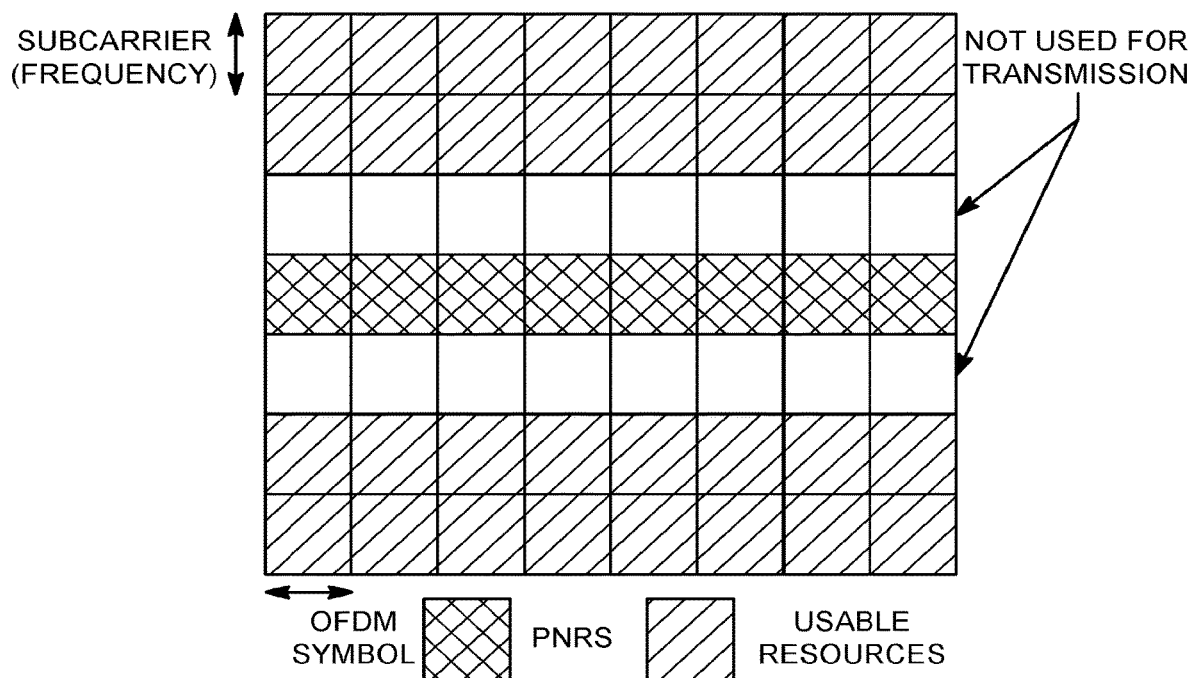
FIG. 3 illustrates an example of PNRS with unused adjacent subcarriers.

FIG. 2 illustrates an example of PNRS using a same subcarrier location over consecutive OFDM symbols. FIG. 3 illustrates an example of PNRS with unused adjacent subcarriers.

Figure 4:
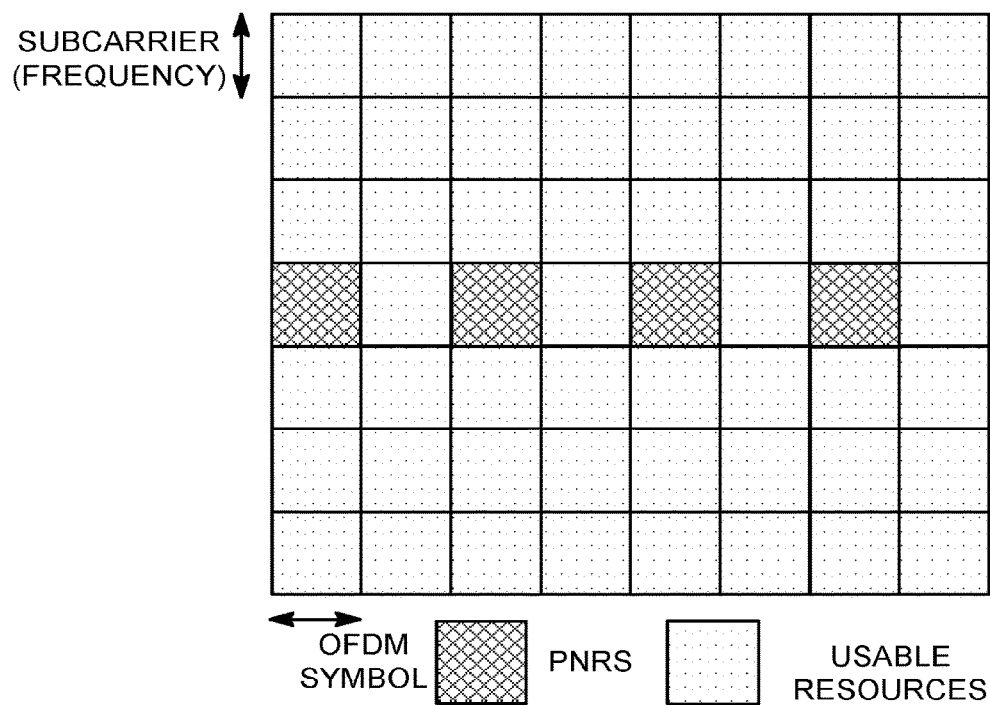
FIG. 4 illustrates an example of a lower density PNRS pattern.

The lower density of the PNRS patterns may be defined. These lower density PNRS patterns may be configured by the eNB, for example if the correlation time of the phase noise is larger than the OFDM symbol length. An example of a lower density PNRS pattern is shown in FIG. 4. A density of PNRS may be determined based on the density in time domain (e.g., the number of OFDM symbols containing PNRS within a time window (e.g., slot, subframe, TTI) and/or the density in frequency domain (e.g., the number of subcarriers used for PNRS within a system bandwidth, a PRB, a PRB-pair, or a scheduled bandwidth)). FIG. 3 shows an example of PNRS with a high density (e.g., in time domain). FIG. 4 shows an example of PNRS with a low density (e.g., in time domain), wherein the lower density PNRS may use a subset of PNRS transmitted or used for higher density PNRS.

The PNRS may be configured for a lower or higher density pattern, e.g., as a function of the numerology (e.g., the sub-carrier spacing and the OFDM symbol duration). For example, for a system operating with a short OFDM symbol duration, a lower density PNRS pattern may be used, e.g., when the correlation time of the phase noise is larger than the OFDM symbol duration. The PNRS density (or density pattern) can be determined based on one or more of the following: subcarrier spacing used or configured for a unicast traffic (e.g., PDSCH, PUSCH); scheduled bandwidth; TTI length; presence of additional DM-RS; resource allocation type; or number of layers.

Subcarrier spacing may be used or configured for a unicast traffic (e.g., PDSCH, PUSCH). A set of subcarrier spacing may be used for a unicast traffic and one of the subcarrier spacings may be configured or used for a PDSCH or a PUSCH transmission, e.g., the PNRS density may be determined based on the subcarrier spacing used or configured. For example, the set of subcarrier spacing {15, 30, 60, 120, 240}kHz may be used and if a WTRU is configured with a subcarrier spacing {15}kHz, the no PNRS may be transmitted (e.g., zero PNRS density), and if the WTRU is configured with a subcarrier spacing {240}kHz, a PNRS with a high density may be used. A set of PNRS densities may be used and a subset of PNRS densities may be determined based on a subcarrier spacing used. One PNRS density within the subset may be determined based on other scheduling parameter(s) (e.g., modulation order, MCS level, scheduling bandwidth, number of layers, etc.). For example, Nd PNRS densities may be used as {PNRS-1, PNRS-2, . . . , PNRS-Nd} and each subcarrier spacing may be associated with a subset of PNRS densities. For example, the first subcarrier spacing (e.g., 15 kHz) may be associated with the subset of PNRS densities {PNRS-1} and the second subcarrier spacing (e.g., 30 kHz) may be associated the subset of PNRS densities {PNRS-1, PNRS-2}; the third subcarrier spacing (e.g., 240 kHz) may be associated with the subset of PNRS densities {PNRS-Nd-1, PNRS-Nd} etc. The PNRS density subset may be determined based on the subcarrier spacing determined. Within the subset of PNRS densities, one PNRS density may be determined for PDSCH or PUSCH transmission, e.g., based on one or more of scheduling parameters. The PNRS-1 may be zero PNRS density, which has no PNRS within the scheduled bandwidth.

The PNRS densities may be determined based on the scheduled bandwidth for PDSCH or PUSCH. For example, the number of subcarriers used for PNRS within a scheduled bandwidth may be determined based on the number of PRBs or PRB-pairs allocated within the scheduled bandwidth. One or more subcarrier per scheduled PRBs may be used for PNRS transmission or reception, e.g., when the number of PRBs scheduled is smaller than a first threshold. A subset of PRBs within a scheduled resources may be used for PNRS transmission or reception if the number of PRBs scheduled is equal to or larger than a first threshold. A subset of PNRS densities may be determined based on a subcarrier spacing and a PNRS density within the subset of PNRS densities may be determined based on the number PRBs scheduled (e.g., scheduled bandwidth). The scheduled bandwidth may be interchangeably used with the number of PRBs scheduled.

The PNRS frequency density may be determined based on the TTI length. The TTI length may be the number of OFDM or DFT-s-OFDM symbols used for a PDSCH or PUSCH transmission or reception, wherein a default TTI length may be defined as a slot (e.g., 14 OFDM symbols for a slot) and a shorter TTI length may be defined as a mini-slot (e.g., the number of OFDM symbols for a mini-slot may be from 1 to 7 OFDM symbols). For example, the PNRS time density may be determined based on the TTI length. A higher frequency density of PNRS may be used for a shorter TTI length. A lower frequency density of PNRS may be used for a longer TTI length.

DM-RS density may be determined based on the presence of additional DM-RS, where the additional DM-RS may be transmitted when configured and/or determined based on one or more of scheduling parameters. When an additional DM-RS is present, a lower density PNRS may be used, where the lower density PNRS may include no PNRS (e.g., zero PNRS density). The default DM-RS may be located within a first part of a slot (e.g., the first 1 or 2 OFDM symbols within a slot) which may be referred to as a front-loaded DM-RS and an additional DM-RS may be located in a later part of the slot (e.g., at the end of OFDM symbols within a downlink part of the slot).

A first PNRS density may be used for a first resource allocation type (e.g., contiguous frequency resource allocation) and a second PNRS density may be used for a second resource allocation type (e.g., non-contiguous frequency resource allocation).

The PNRS density may be determined based on the number of layers used, wherein the layer may be a data stream and the number of layer may be interchangeably used with the transmission rank. A higher density may be used for a higher number of layers and a lower density may be used for a lower number of layers.

The PNRS may be inserted as an input to the IFFT block (e.g., when OFDM is used for transmission) and it may be transmitted on a reserved subcarrier, e.g., as illustrated in FIG. 2 and FIG. 3. In FIG. 3, the subcarriers adjacent to the PNRS are left blank, which may minimize the interference on the PNRS. The PNRS may be inserted as an input to the DFT block together with the data symbols (e.g., when DFT-s-OFDM is used for transmission). PNRS may be inserted in time domain, after the IFFT, e.g., by puncturing some of the time-domain samples and replacing them with pilot symbols. The adjacent subcarriers (e.g., a subcarrier next to the subcarrier containing PNRS) may be blank, unused, and/or muted. A WTRU may be scheduled in a subband which may include PNRS and adjacent subcarriers. The WTRU may assume that the adjacent subcarriers are muted, and, the WTRU may rate-match around or puncture the adjacent subcarriers for its scheduled downlink transmission.

Puncturing and or multiplexing the PNRS may be provided. In the following, phase noise reference signal (PNRS) and phase tracking reference signal (PTRS) may be used interchangeably.

Pre-DFT PTRS may be provided. The phase noise reference signals may be inserted into the DFT block in a system transmitting using the DFT-s-OFDM waveform. One or more of the following may apply (e.g., features relating to those illustrated in FIG. 5 and FIG. 6).

Figure 5:
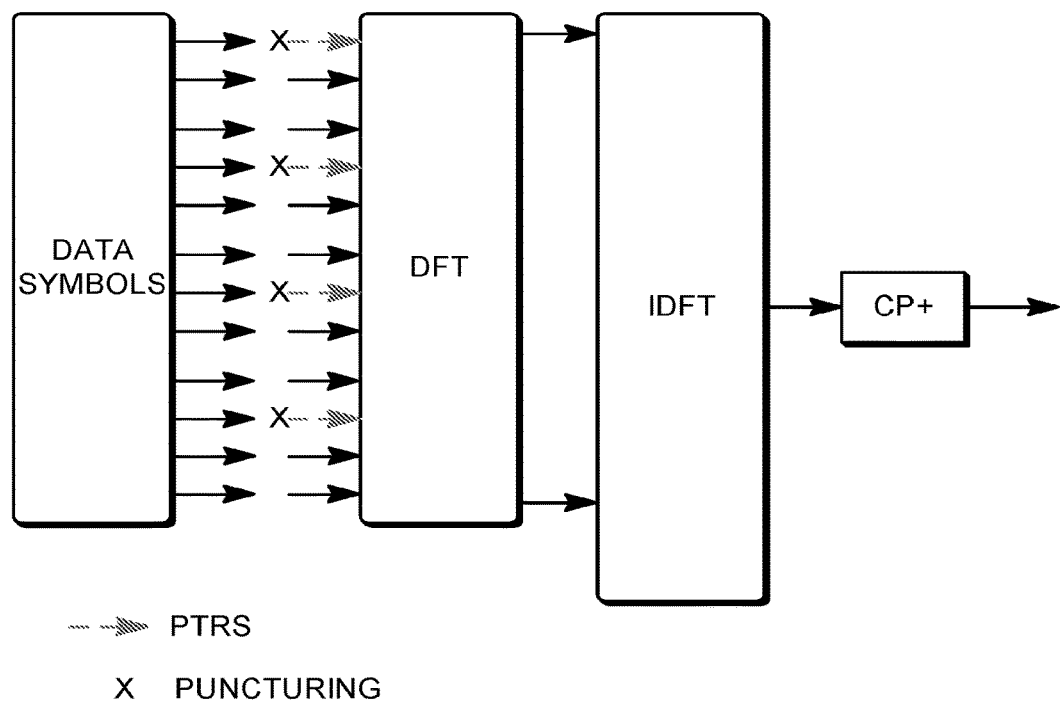
FIG. 5 illustrates an example of pre-DFT PNRS insertion via puncturing.

In examples, puncturing may be provided. FIG. 5 illustrates an example of pre-DFT PNRS insertion via puncturing. The number of the data symbols may match the number of the inputs of the DFT. Some of these data symbols may be punctured and/or replaced with reference symbols, e.g., before they are mapped to the corresponding inputs of the DFT block. As an example, assume one subframe has 14 OFDM symbols and 24 subcarriers are allocated for data transmission; so the size of the DFT is set to 24. If QPSK is used, 24×14=336 QPSK symbols may be transmitted in a subframe. With ½ coding rate, this may correspond to 336 information bits. If 4 reference symbols are transmitted per OFDM symbol, then 20 QPSK symbols (e.g., only 20 QPSK symbols) can be mapped to the DFT block. The remaining 4 QPSK symbols may be replaced by the reference symbols.

Figure 6:
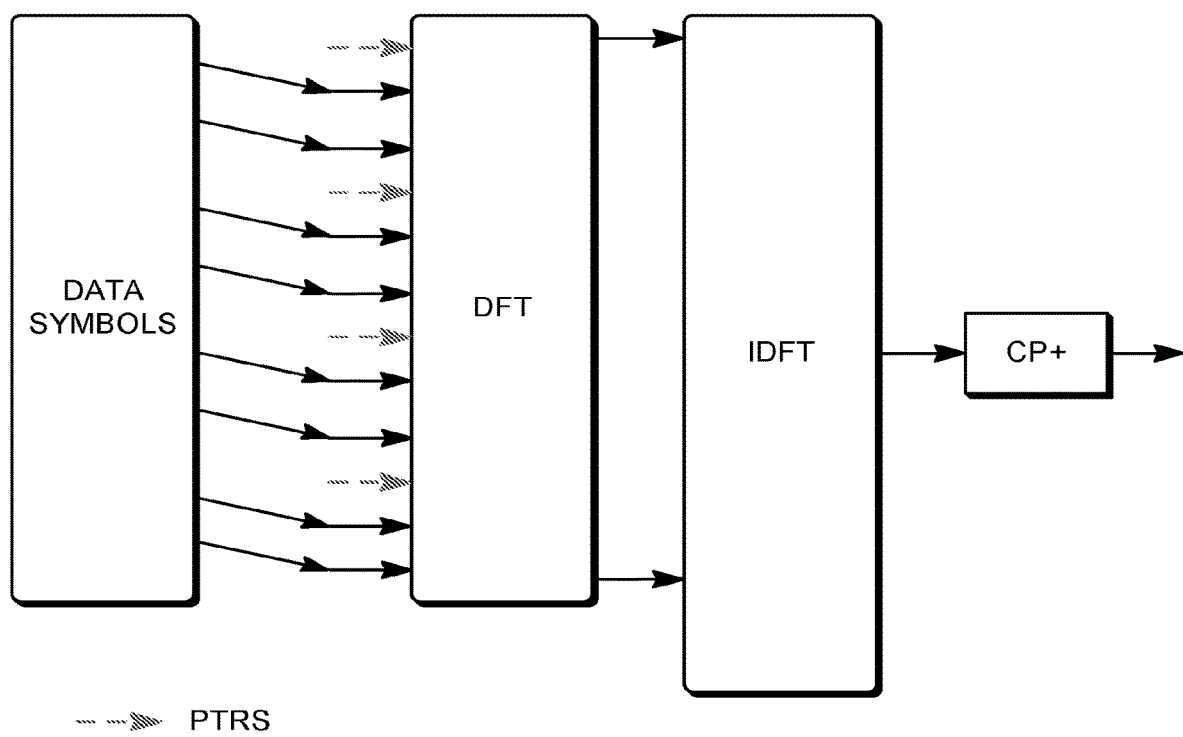
FIG. 6 illustrates an example of pre-DFT PNRS insertion via multiplexing.

In examples multiplexing may be provided. FIG. 6 illustrates an example of pre-DFT PNRS insertion via multiplexing. The number of data symbols to be transmitted in an OFDM symbol may be smaller than the DFT size. After the data symbols are mapped to the corresponding inputs of the DFT, it may still be possible to insert additional symbols into the DFT block. These additional symbols may be selected to be reference symbols. Using the same example above, with multiplexing, the number of information bits transmitted in the subframe may be 280 bits. After ½ rate coding and QPSK modulation, each OFDM block may transmit 20 QPSK symbols. The remaining 4 inputs of the DFT block may be used by the PNRS, e.g., since the DFT size is 24.

The density of PNRS in DFT-s-OFDM using pre-DFT PNRS insertion may be determined based on number of DFT-s-OFDM symbols containing PTRS, which may be referred to as PNRS time density and number of symbols within the data symbols (or data symbol vector) for a DFT input which may be referred to as a PNRS frequency density. The PNRS density may be determined based on one or more of DFT size or a number of DFT blocks. For example, the DFT size of DFT-s-OFDM for PUSCH transmission may be used to determine the PNRS frequency density (e.g., number of symbols used for PNRS within the data symbol vector). One or more DFT blocks may be used for PUSCH transmission and the PNRS density may be determined based of the number of DFT blocks. A higher PNRS density may be used when the number of DFT blocks is larger than one, while a lower PNRS density may be used when the number of DFT block is one. The number of DFT blocks may be larger than one when the scheduled uplink resource is not contiguous in frequency domain.

Figure 7:
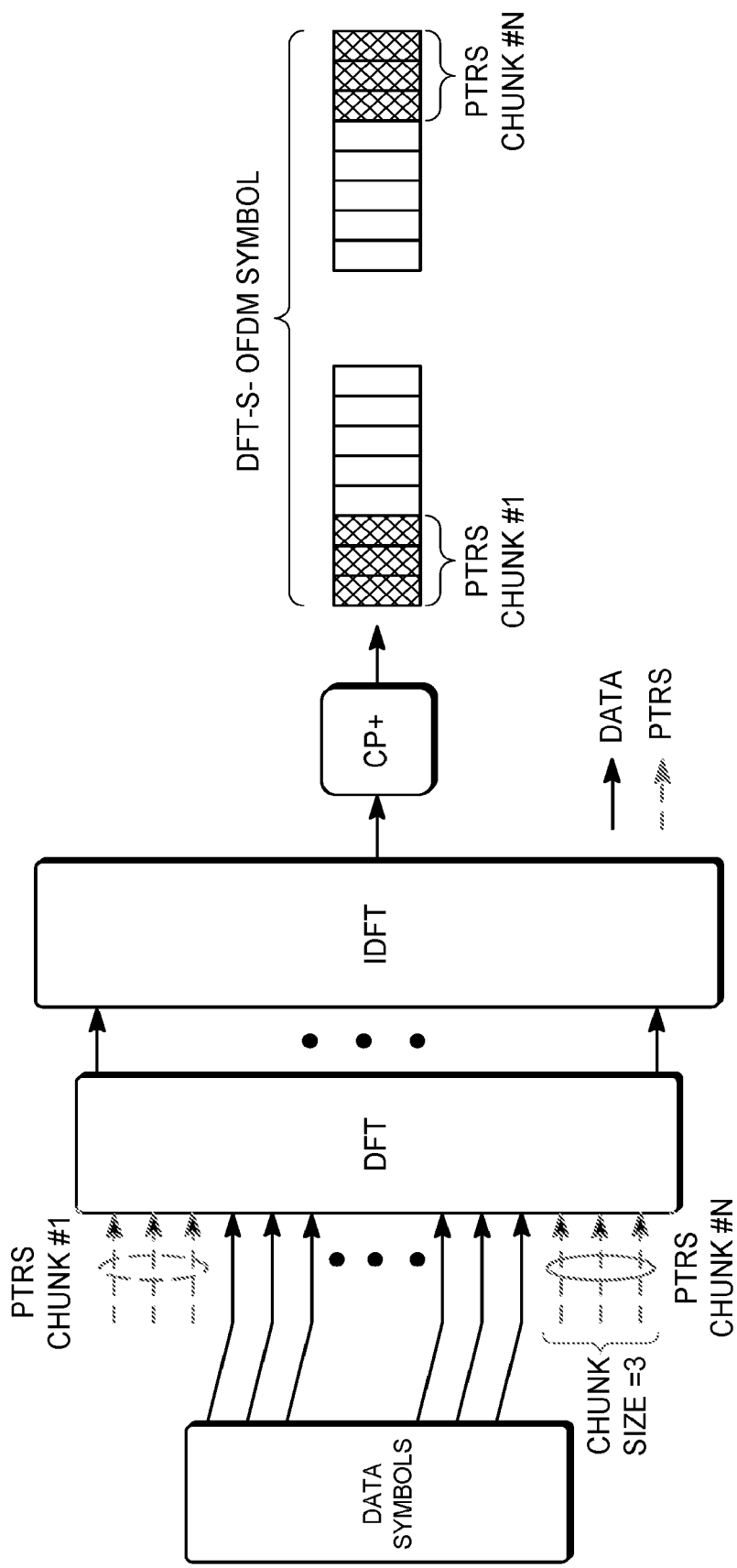
FIG. 7 illustrates an example of pre-DFT PNRS insertion via multiplexing.

Chunk-based pre-DFT PTRS insertion may be performed. A PTRS pattern for a chunk-based pre-DFT PTRS insertion may be determined based on at least one of a number of PTRS chunks (Nc), a chunk size (Ns), or locations of Nc chunks within the DFT inputs (or DFT input signal). FIG. 7 shows an example of a PTRS pattern with Nc and Ns values of a PTRS pattern, wherein Nc=N chunks with Ns=3 are used. The chunk size (Ns) may be the number of PTRS tone(s) within a chunk. The PTRS tone may be interchangeably used with PTRS sample, PTRS RE, and/or PTRS subcarrier.

A group of PTRS patterns that may have the same density may be referred to as a PTRS type. PTRS patterns in a same PTRS type may have different Ns and/or Nc values while the total number of PTRS tones (e.g., Ns×Nc) is the same. The total number of PTRS tones may be interchangeably used with PTRS density.

In examples, a first PTRS type (e.g., PTRS Type-1) may be based on the PTRS density=4. A first PTRS pattern in the PTRS Type-1 may be Nc=2 and Ns=2, and a second PTRS pattern in the PTRS Type-1 may be Nc=4 and Ns=1.

In examples, a first PTRS type (e.g., PTRS Type-1) may be based on the PTRS density=4. The PTRS patterns in the PTRS Type-1 may have the same Nc and Ns values while the locations of Nc chunks may be different. For example, when Nc=2, a first PTRS pattern may have the PTRS chunks at the front and the end of the DFT inputs. A second PTRS pattern may have the PTRS chunks at the middle and the end of DFT inputs. A third PTRS pattern may have the PTRS chunks at the front and the middle.

The locations of Nc chunks in a DFT input may be determined based on a cyclic shift value of DFT input signal and/or IDFT output signal. A base PTRS pattern may be defined, determined, or configured and its cyclic shift versions may be considered as or referred to as different PTRS patterns in a same PTRS type. For example, a base PTRS pattern may be referred to as a PTRS pattern with zero cyclic shift value (e.g., CS=0), a cyclic shifted version of the base PTRS pattern may be referred to as a PTRS pattern with a cyclic shift value (e.g., CS=1). A cyclic shifted version of the base PTRS pattern may be referred to as a PTRS pattern in the same PTRS type.

The PTRS density may be different based on the PTRS pattern and/or PTRS type. For example, a first PTRS pattern (or PTRS type) may have a first PTRS density and a second PTRS pattern (or PTRS type) may have a second PTRS density, wherein the first PTRS density may be higher than the second PTRS density. The PTRS density may be referred to as the number of PTRS tones for the DFT inputs and/or the number of DFT-s-OFDM symbols containing PTRS in a PUSCH transmission. The PTRS density may be referred to as the number of PTRS subcarriers within a scheduled bandwidth and/or the number of OFDM symbols containing PTRS in a PUSCH or PDSCH. A PTRS density (e.g., in frequency domain may be referred to as a PTRS subcarrier) is used every Np scheduled PRBs, wherein the starting PRB may be determined based on at least one of a fixed number (e.g., a first PRB of the scheduled PRBs), a configured number (e.g., a higher layer configured parameter), a number determined based on a WTRU-specific parameter (e.g., WTRU-ID, scrambling ID), and a cell specific parameter (e.g., cell-ID). The allocated PRBs may be ordered from 0 to Nprb−1 irrespective of the PRB locations, wherein Nprb may be referred to as the number of PRBs allocated for the WTRU.

A PTRS density, a PTRS pattern, a chunk size of a PTRS pattern, a number of chunks of a PTRS pattern, and/or a PTRS type for a PUSCH transmission may be determined based on at least one of a scheduled bandwidth, modulation order or modulation and coding scheme (MCS) level, numerology, transport block size (TBS) and/or DM-RS configuration for the scheduled PUSCH transmission. Numerology may include at least one of a subcarrier spacing, a slot length, a TTI length, and a CP length.

In examples, a first PTRS pattern may be used if a scheduled bandwidth for a PUSCH transmission is less than or equal to a first threshold, and a second PTRS pattern may be used if a scheduled bandwidth for a PUSCH transmission is greater than the first threshold and less than or equal to a second threshold. The scheduled bandwidth may be interchangeably used with DFT input size.

In examples, a first PTRS pattern may be used if a scheduled modulation order or MCS level is less than or equal to a first threshold, and a second PTRS pattern may be used if a scheduled modulation order or MCS level is greater than the first threshold and less than or equal to a second threshold.

A DM-RS configuration may be based on the number of DM-RS symbols (e.g., DFT-s-OFDM symbols or CP-OFDM symbols used for DM-RS transmission) and/or the location of DM-RS symbols. For example, a first DM-RS configuration may have two DM-RS symbols that may be located at the first two DFT-s-OFDM symbols or CP-OFDM symbols, and a second DM-RS configuration may have two DM-RS symbols that may be located at the first DFT-s-OFDM symbol or CP-OFDM symbol and the last DFT-s-OFDM symbol or CP-OFDM symbol.

Figure 8:
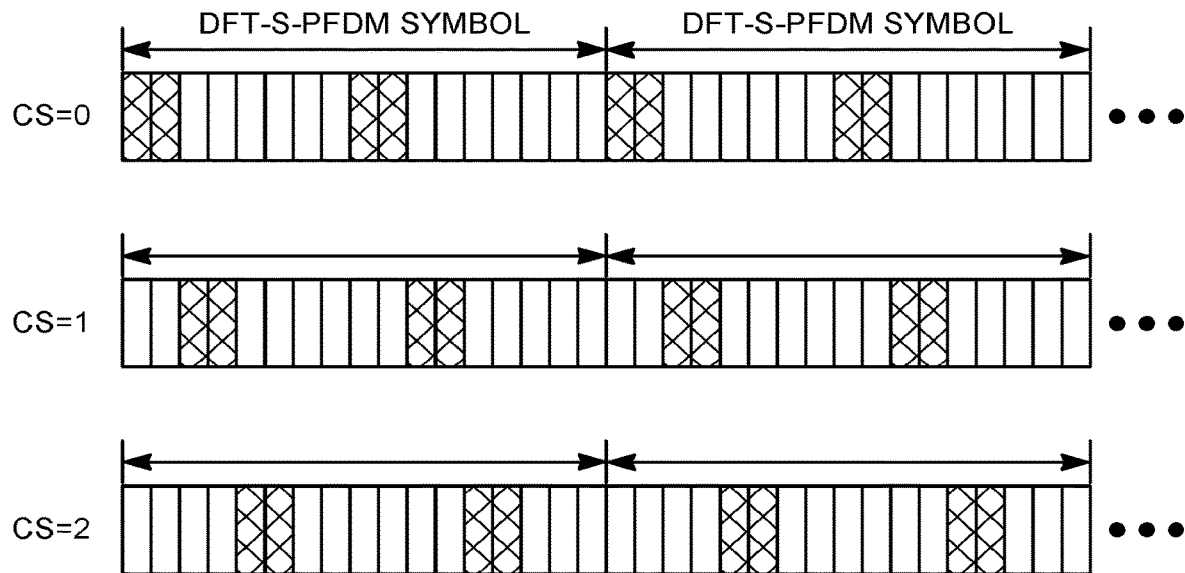
FIG. 8 illustrates an example base PTRS pattern with cyclic shift (CS) values.

Pre-DFT PTRS insertion may be performed for multi-user transmission. A base PTRS pattern with cyclic shift values may be used, wherein a base PTRS pattern may be determined based on Ns, Nc, or locations of Nc chunks and its cyclic shifted version may have the same Ns and Nc while the location of Nc chunks may have an offset (e.g., time offset) from the base PTRS pattern. FIG. 8 shows an example of a base PTRS pattern (e.g., CS=0) and its cyclic shifted version of the base PTRS pattern.

A base PTRS pattern and its cyclic shifted versions of the base PTRS pattern may be used. A base PTRS pattern may be used, configured, or determined based on one or more scheduling parameters including at least one of scheduled bandwidth, a number of PRBs, TTI length, DM-RS configuration, MCS level, and transport block size. The cyclic shift value may be determined based on a WTRU-specific parameter or an indicator in the associated DCI.

The set of cyclic shift values may be configured via a higher layer signaling. Additionally or alternatively, the set of cyclic shift values may be determined based on one or more of a base PTRS pattern, a scheduled bandwidth, and/or frequency location of the scheduled bandwidth.

The WTRU-specific parameter may include at least one of a WTRU capability, a WTRU category, a WTRU-ID (e.g., C-RNTI, IMSI modulo X). WTRU-ID modulo Ncs may be used to determine the cyclic shift value. Ncs may be a maximum number of cyclic shift values or a total number of cyclic shift values. The DM-RS configuration may include at least one of the number of symbols used for DM-RS transmission, time/frequency locations of DM-RS symbols, and/or DM-RS antenna ports number(s) indicated for a PUSCH transmission.

A zero-power PTRS may be used. For example, a WTRU may be indicated to transmit one or more zero-power PTRS when the WTRU is scheduled for a PUSCH transmission. Zero-power PTRS pattern may be determined based on a base PTRS pattern and its cyclic shifted versions. The WTRU may avoid sending a signal on the REs for zero-power PTRS.

Figure 9:
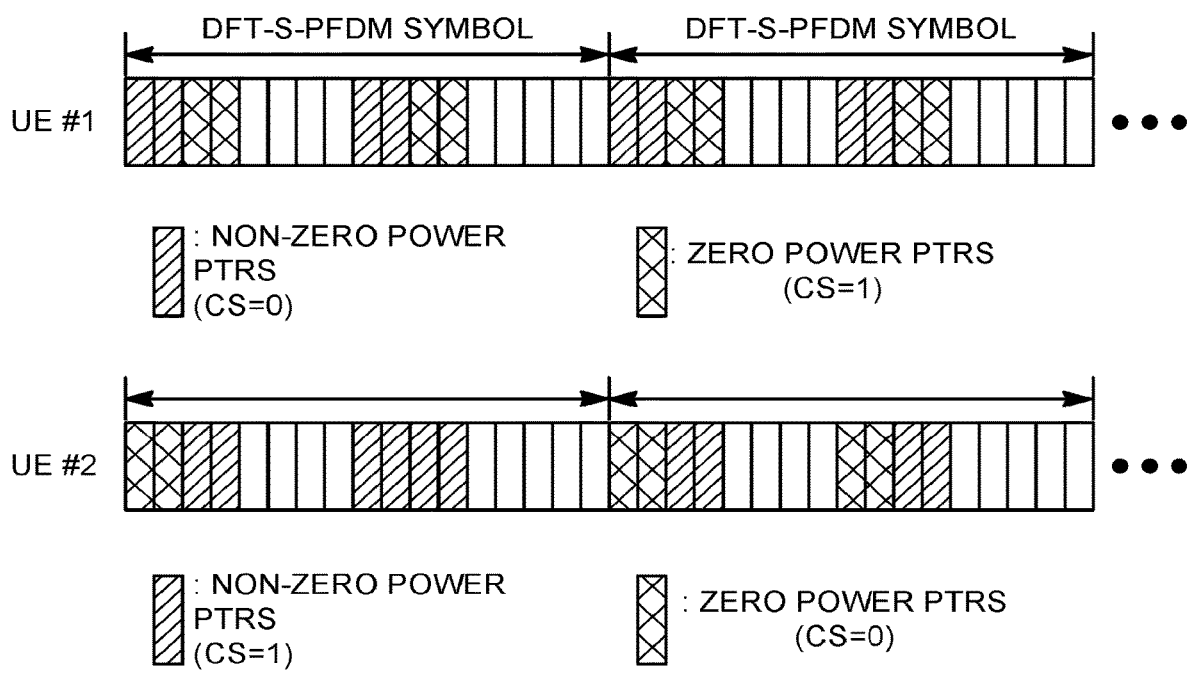
FIG. 9 illustrates example WTRU-specific zero-power and non-zero-power PTRS patterns with different CS values.

FIG. 9 illustrates example WTRU-specific zero-power and non-zero-power PTRS patterns with different CS values. The PUSCH REs for zero-power PTRS may be punctured or rate-matched around. Reference signal sequence for zero-power PTRS may be all zero values. The base PTRS pattern for zero-power PTRS pattern may be the same as non-zero power PTRS pattern, and cyclic shift values may be different between zero-power PTRS pattern and non-zero-power PTRS pattern. The cyclic shift values for zero-power PTRS pattern may be indicated as a part of scheduling parameters. The cyclic shift values for zero-power PTRS patterns may be determined based on the cyclic shift value(s) of non-zero-power PTRS patterns. The cyclic shift values for zero-power PTRS patterns may be determined based on DM-RS port number allocated for a PUSCH transmission. The base PTRS pattern and its cyclic shifted versions for zero-power PTRS may be separately configured, e.g., via a higher layer signaling.

Figure 10:
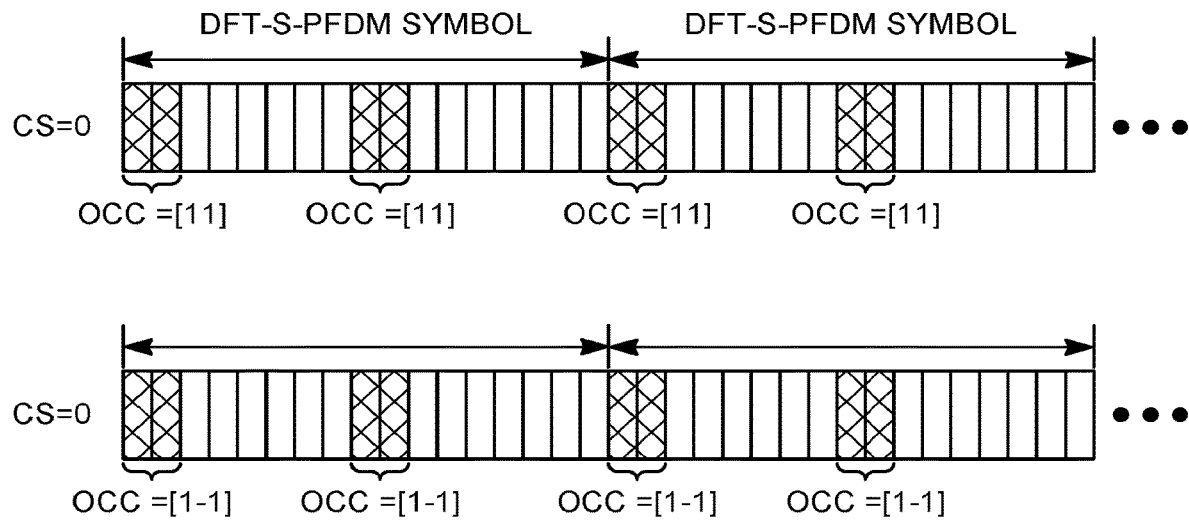
FIG. 10 illustrates example WTRU-specific OCC for PTRS tones within a PTRS chunk.

FIG. 10 illustrates example WTRU-specific OCC for PTRS tones within a PTRS chunk. An orthogonal cover code (OCC) may be used for the PTRS. For example, an OCC may be used for the PTRS tones within a chunk. The OCC may be interchangeably used with orthogonal sequence, random sequence, PN sequence, Zadoff-Chu sequence, scrambling sequence, and/or golay sequence. The OCC may be determined based on chunk size and one or more WTRU-specific parameter. For example, a first OCC (e.g., [1 1]) may be used for the PTRS tones in each chunk if WTRU-ID modulo 2 is '0' and a second OCC (e.g., [1–1]) may be used for the PTRS tones in each chunk if WTRU-ID modulo 2 is '1'. The OCC parameter may be indicated in the associated DCI. The OCC parameter may be determined based on one or more scheduling parameter. For example, OCC parameter for PTRS may be determined based on DM-RS configuration (e.g., DM-RS port). If a WTRU is configured with DM-RS port-0, the WTRU may use a first OCC (e.g., [1 1]) and if a WTRU is configured with DM-RS port-1, the WTRU may use a second OCC (e.g., [1 −1]). If OCC is based on a scrambling sequence, the scrambling sequence initialization may be based on WTRU-ID.

Post-DFT PTRS may be provided. The phase noise reference signals may be inserted into the IDFT block in a system transmitting using the DFT-s-OFDM waveform. One or more of the following may apply (e.g., features relating to those illustrated in FIG. 11 and FIG. 12).

Figure 11:
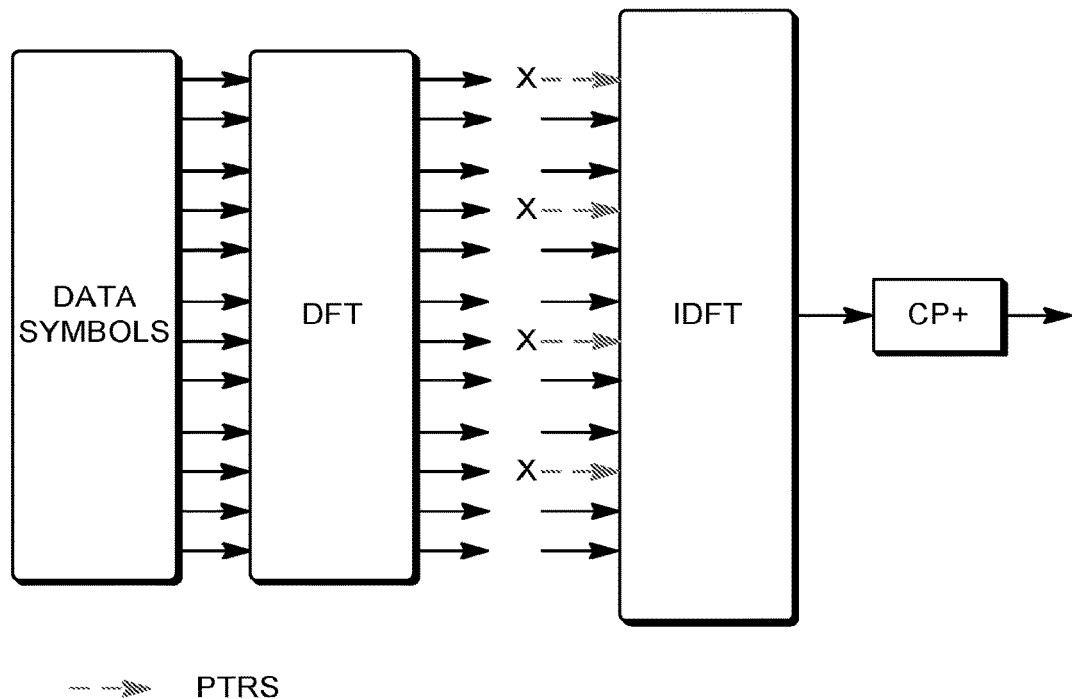
FIG. 11 illustrates an example of Post-DFT PNRS insertion via puncturing.

In examples puncturing may be provided. FIG. 11 illustrates an example of Post-DFT PNRS insertion via puncturing. Several outputs of the DFT block are punctured and replaced with reference symbols.

Figure 12:
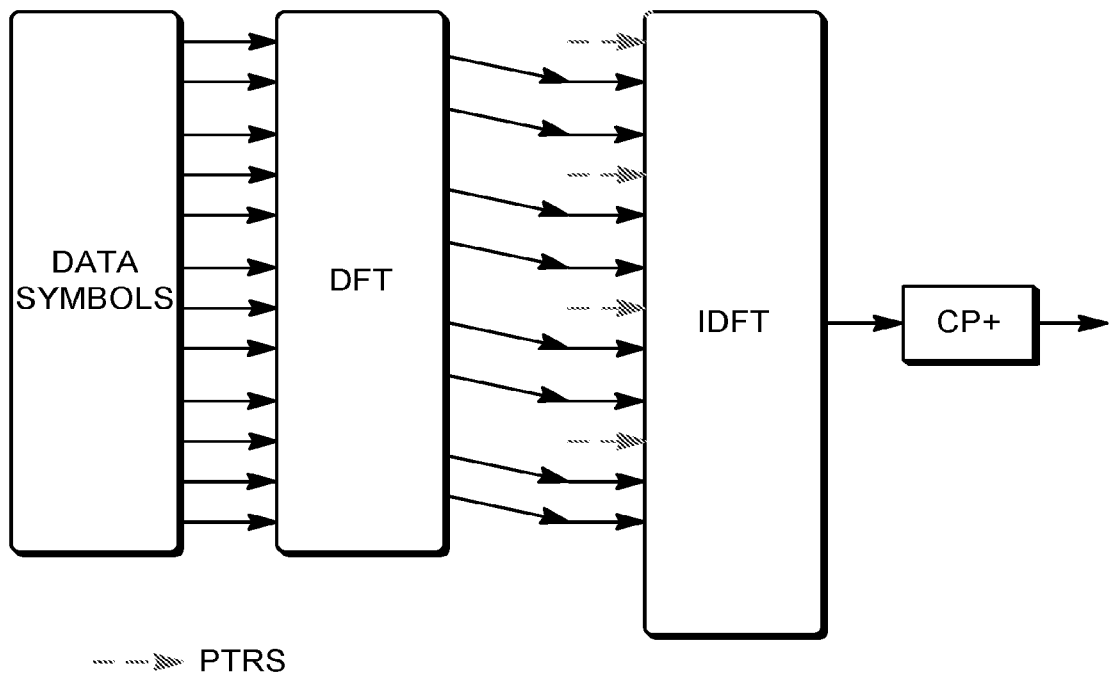
FIG. 12 illustrates an example of post-DFT PNRS insertion via multiplexing.

In examples multiplexing may be provided. FIG. 12 illustrates an example of post-DFT PNRS insertion via multiplexing. The outputs of the DFT block and reference symbols may be multiplexed and mapped to the corresponding subcarriers.

Figure 13:
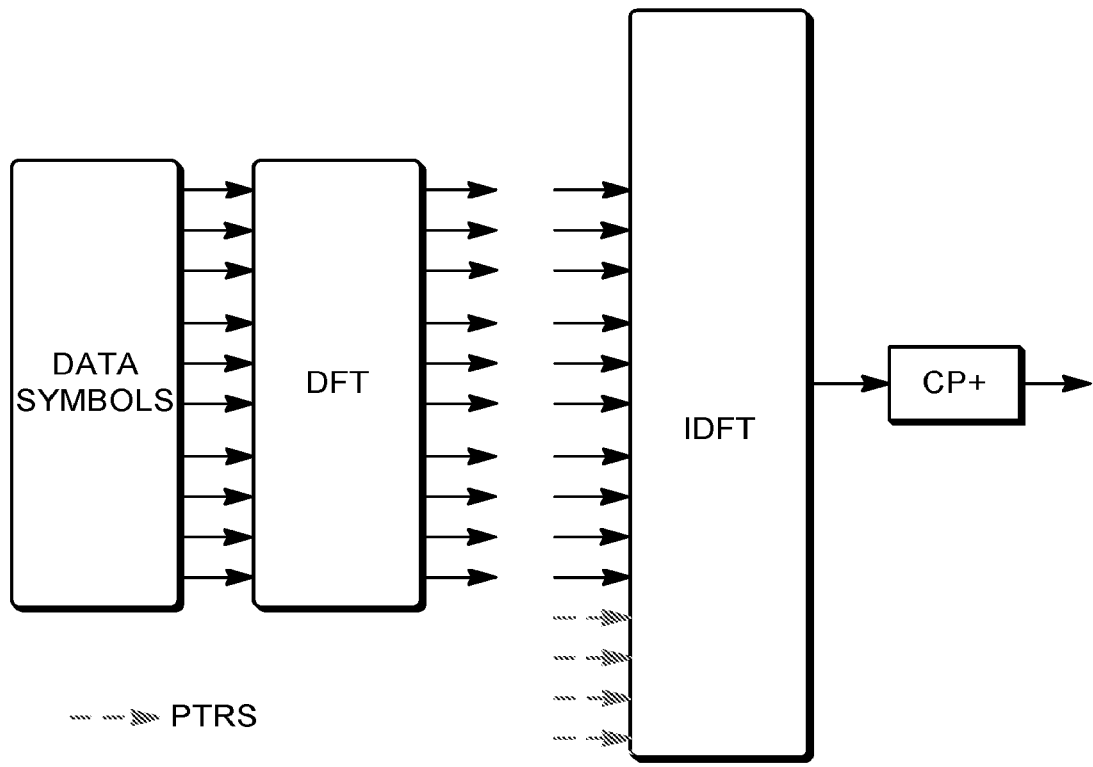
FIG. 13 illustrates an example of Post-DFT PNRS insertion via multiplexing.

The locations of the phase noise reference symbols illustrated in the figures are exemplary locations and they may be mapped to different inputs than shown. For example, PNRS may be mapped to the IDFT as shown in FIG. 13, which illustrates an example of Post-DFT PNRS insertion via multiplexing. The subcarriers used for the transmission of PNRS by a WTRU may be used by other WTRU(s) to transmit PNRS as well. In such a case, the PNRS from different WTRUs may need to be orthogonalized by using spreading and/or orthogonal cover codes in time domain (e.g., over consecutive OFDM symbols).

In examples, one or more PNRS types may be used for DFT-s-OFDM. For example, a first PNRS type may be used when a single-user MIMO transmission is used and a second PNRS type may be used when a multi-user MIMO transmission is used, wherein the first PNRS type may be post-DFT PNRS and the second PNRS type may be a pre-DFT PNRS.

The PNRS type (e.g., pre-DFT PNRS or post-DFT PNRS) or PNRS scheme (e.g., multiplexing or puncturing) for a DFT-s-OFDM transmission may be determined based on at one or more of following: the uplink MIMO transmission mode or scheme used, the modulation order used, the channel coding scheme used, the transport block size scheduled, the number of resource block(s) scheduled, or the number of DFT-s-OFDM symbols used in a slot or a mini-slot.

An uplink MIMO transmission mode or scheme may be used. For example, a closed-loop transmission scheme may use a first PNRS type/scheme and an open-loop transmission scheme may use a second PNRS type/scheme.

A modulation order may be used. For example, a lower modulation order (e.g., QPSK and 16QAM) may use a first PNRS type/scheme and a higher modulation order (e.g., 64QAM) may use a second PNRS type/scheme.

A channel coding scheme may be used. For example, a first channel coding scheme (e.g., LDPC) may use a first PNRS type/scheme and a second channel coding scheme (e.g., polar) may use a second PNRS type/scheme.

A transport block size may be scheduled. For example, if a transport block size is greater than a predefined threshold, a first PNRS type/scheme may be used; otherwise, a second PNRS type/scheme may be used.

Figure 14:
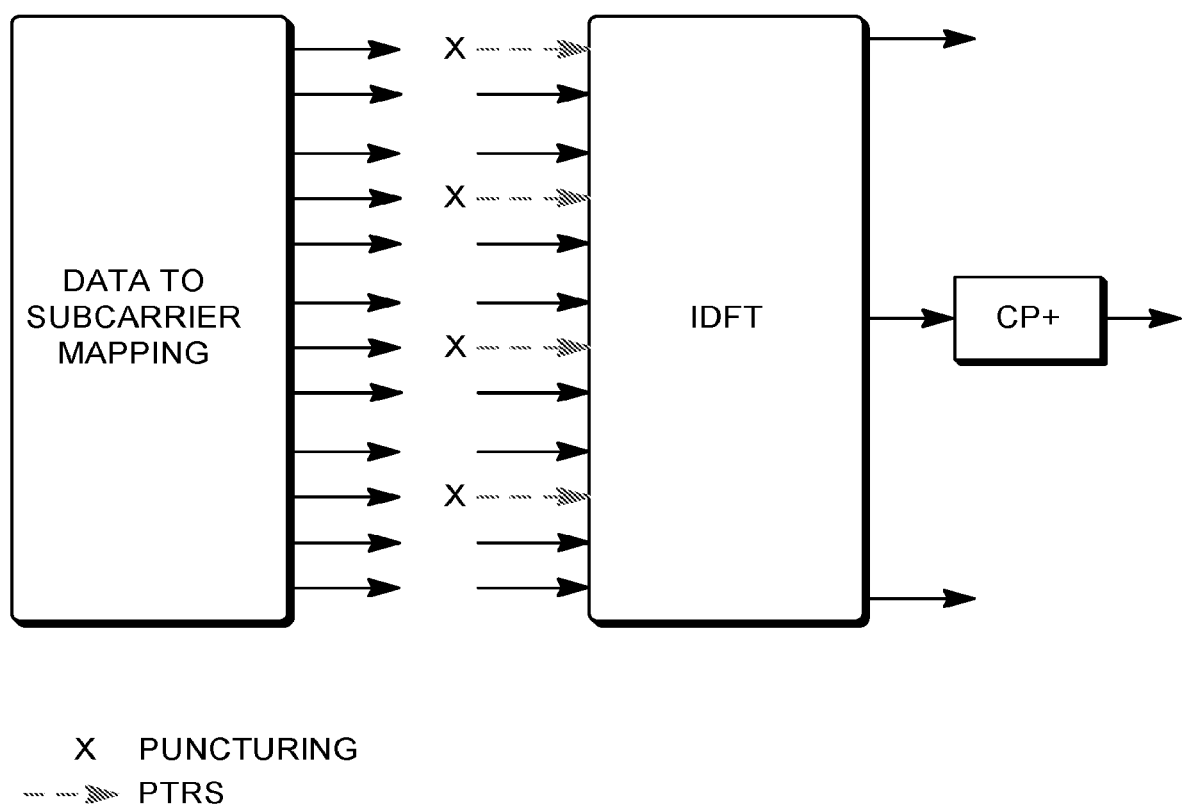
FIG. 14 illustrates an example puncturing in OFDM for PNRS insertion.

PNRS with OFDM may be provided. The transmission of PNRS may be turned on and off on a user basis. The number of PNRS may adaptively change depending on the modulation order and/or other parameters. The number of subcarriers allocated to PNRS may change, which may result in a need to adaptively change the transport block size. In examples, the transport block size may be kept constant, e.g., even when PNRS is turned on or the number of PNRS is changed. Puncturing may be introduced to map the data symbols to the available data subcarriers. An example is shown in FIG. 14, which illustrates an example puncturing in OFDM for PNRS insertion. The data symbols planned to be transmitted on the PNRS-carrying subcarriers may be punctured and replaced with PNRS, e.g., when PNRS has to be transmitted.

Configuration of the puncturing and/or multiplexing patterns may be provided. The PNRS multiplexing and/or puncturing patterns (e.g., the number of PNRS symbols in an OFDM symbol; which inputs of the DFT and or the IDFT are used to feed in the PNRS, which OFDM symbols have PNRS) may be configured by a central controller. The number of PNRS symbols in an OFDM symbol may be referred to as a frequency density of PNRS (or a frequency pattern of PNRS) and which OFDM symbols have PNRS may be referred to as a time density of PNRS (or a time pattern of PNRS). One or more of the following may apply, e.g., for configuration of the puncturing and/or multiplexing patterns.

The PNRS pattern or pattern subset may be determined based on one or more of the following: Operating frequency band, MCS level (e.g., modulation order and/or coding rate), numerology (e.g., subcarrier spacing and/or system bandwidth), higher layer signalling, scheduled bandwidth (or the number of PRBs scheduled), the number of layers for SU-MIMO transmission (e.g., transmission rank), MIMO mode of operation (e.g., SU-MIMO or MU-MIMO), waveform used (e.g., CP-OFDM or DFT-s-OFDM), and/or DM-RS density (e.g., front-loaded DM-RS only or front-loaded DM-RS with an additional DM-RS; number of OFDM or DFT-s-OFDM symbols used for DM-RS).

All or a subset of PRBs may be used for PNRS transmission. When a subset of PRBs carries PNRS, the subset of PRBs that carry PNRS may be determined based on one or more of following: DM-RS port or a set of DM-RS ports allocated or indicated in an associated DCI or WTRU specific parameters. For example a DM-RS port or a set of DM-RS ports may be allocated or indicated in an associated DCI for MU-MIMO operation and the set of PRBs which may carry PNRS may be determined based on the DM-RS port or the set of DM-RS ports allocated. Every 2nd PRB with a PRB offset=0 may contain PNRS if a first DM-RS port (or a first set of DM-RS ports) is indicated; every 2nd PRB with a PRB offset=1 may contain PNRS if a second DM-RS port (or second set of DM-RS ports) is indicated. A WTRU-specific parameter (e.g., WTRU-ID, C-RNTI, scrambling identity, scrambling identity of PNRS, etc.) may be provided. For example, a first WTRU may transmit (or receive) every 2nd PRB of the scheduled PRBs with a PRB offset=0 while a second WTRU may transmit (or receive) every 2nd PRB of the scheduled PRBs with a PRB offset=1, where the PRB offset may be determined based on WTRU-specific parameter.

For scheduled UL transmissions, the eNB may signal to the WTRU which PNRS pattern to use. The eNB may signal this information to the WTRU for example with the UL grant. One or more of the following of the following may apply: all the RBs allocated for UL transmissions (e.g., all the RBs allocated for UL transmissions) may be configured to carry at least one PNRS (e.g., when PNRS are fed into the IDFT); the possible patterns may be pre-defined, e.g., the eNB may signal to the WTRU the index of the desired pattern; the PNRS pattern to use may be determined (e.g., implicitly) based on the number of allocated PRBs; and/or the PNRS pattern to use may be determined (e.g., implicitly) based on the MCS level indicated in the UL grant.

For scheduled DL transmissions, the eNB may signal to the WTRU which PNRS pattern is used in the transmission. The eNB may signal this information to the WTRU for example with the DL grant. One or more of the following may apply: the RBs allocated for DL transmissions (e.g., all the RBs allocated for DL transmissions) may be configured to carry at least one PNRS (e.g., when PNRS are fed into the IDFT); the possible patterns may be pre-defined, e.g., the eNB may signal to the WTRU the index of the desired pattern; the PNRS pattern to use may be determined (e.g., implicitly) based on the number of allocated PRBs; and/or the PNRS pattern to use may be determined (e.g., implicitly) based on the MCS level indicated in the UL grant.

For an UL transmission with DFT-s-OFDM and when the PNRS are fed into the DFT block one or more of the following may apply. A continuous set of inputs of the DFT, e.g., starting with the lowest index, may be used to transmit the PNRS. A continuous set of inputs of the DFT starting with the highest index may be used to transmit the PNRS. A certain set of inputs of the DFT may be used to transmit the PNRS, e.g., wherein the set of inputs may be determined based on one or more of: predetermined location; WTRU parameters (e.g., WTRU-ID), service type (e.g., URLLC, eMBB, and mMTC), etc.; or system parameter(s) (e.g., subframe number, radio frame number, cell-ID).

For an UL transmission with OFDM and when the PNRS are fed into the IDFT block by puncturing or multiplexing one or more of the following may apply. A first PRB of scheduled PRBs for an uplink transmission may be used to transmit a UL PNRS, e.g., wherein the first PRB may be the PRB with a lowest index within the PRBs scheduled for a WTRU. In examples, the first PRB may be the PRB with a highest index within the PRBs scheduled for a WTRU. A certain PRB of scheduled PRBs for an uplink transmission may be used to transmit a UL PNRS, e.g., wherein the certain PRB may be determined based on one or more of: a predetermined location (e.g., first or last PRBs in a schedule PRBs); WTRU-specific parameter(s) (e.g., WTRU-ID, service type (e.g., URLLC, eMBB, and mMTC); or system parameter(s) (e.g., subframe number, radio frame number, cell-ID). The first N subcarriers of the first PRB in the scheduled PRBs may be used to transmit UL PNRS. The first N subcarriers of the last PRB in the scheduled PRBs may be used to transmit UL PNRS.

The multiplexing and/or puncturing pattern for the PNRS may be implicitly determined, e.g., from the resource allocation. For example, the number of subcarriers allocated, the modulation order, and/or the transport block size may be determined based on how many inputs of the DFT and/or the IDFT do not need to be used for data transmission. These inputs may (e.g., then) be used for PNRS transmission. The location of the PNRS (e.g., which inputs of the DFT and/or the IDFT to feed in the PNRS) may not be known implicitly, it may be pre-configured. For example, the first/last N inputs may be used to transmit PNRS. The PNRS may be distributed over the allocated resources with a pre-determined rule (for example uniformly, starting from index=0 of the resources).

The transport block size (e.g., of the data block to be transmitted) may differ based on the number of resources allocated for PNRS, for example if multiplexing of data and PNRS is used. The WTRU may determine the actual transport block size used for transmission from a nominal transport block size signaled by the eNB and/or the PNRS configuration. As an example, assume the eNB signals to the WTRU to transmit a block size of N information bits using 16 QAM modulation and ½ coding rate, resulting in {(N×2)/log 2(16)}=N/2 subcarriers being used for transmission (e.g., N/2 DFT size if DFT-s-OFDM is used). If K resources (e.g., subcarriers) over the duration of the subframe are reserved for PNRS, then the actual transport block size may be N−2K information bits. The same may apply to the determination of the transport block size in DL transmission.

PNRS may be used with multiple TRPs. One or more types of PNRS may be used. For example, a first type of PNRS may be common for (e.g., all) WTRUs (or shared by (e.g., all) WTRUs) in a cell while a second type of PNRS may be a WTRU specific or a WTRU group specific. A first type of PNRS may be transmitted in a predefined or a predetermined location while a second type of PNRS may be transmitted via scheduled resource(s). The first type of PNRS may be used as a default PNRS. The second type of PNRS may be used as a supplemental PNRS. The second type of PNRS may be transmitted or presented based on one or more conditions. For example, the second type of PNRS may be present (or be transmitted) in a scheduled resource, e.g., based on one or more scheduling parameters. One or more of following may apply: if modulation order is higher than a predefined threshold, the second type of PNRS may be present, for example, if a modulation order is higher than QPSK (e.g., 16QAM or 64QAM), the second type of PNRS may be present; or if transmission rank is higher than a predefined threshold, the second type of PNRS may be present.

One or more PNRS configurations may be transmitted or used. The associated PNRS for a demodulation may be determined based on downlink channel types. For example, two PNRS configurations may be used and a first PNRS configuration may be associated with a downlink control channel and a second PNRS configuration may be associated with a downlink data channel. A PNRS configuration may include one or more of time/frequency locations, associated transmission/reception point (TRP), reference signal power, scrambling code, scrambling ID, or periodicity. A first PNRS configuration may be associated with a downlink control channel (e.g., PDCCH) and a second PNRS configuration may be associated with a downlink data channel (e.g., PDSCH). The association between PNRS configuration and a downlink channel may be predetermined, configured via higher layer, or dynamically indicated. A first PNRS configuration may be associated with a downlink control channel and one or more PNRS configurations may be associated with a downlink data channel.

Downlink control channel, PDCCH, and enhanced PDCCH (EPDCCH) may be interchangeably used.

One or more PNRS configurations may be transmitted or used for a downlink signal transmission, wherein the one or more PNRS may be used to demodulate the downlink signal. An associated PNRS may be indicated to a WTRU for a downlink signal demodulation. For example, multiple PNRS configurations may be transmitted or used and one of the PNRS configurations may be associated for a physical downlink shared data channel (PDSCH) which may be scheduled for a WTRU. For the PDSCH demodulation, a WTRU may be indicated which PNRS configuration within the multiple PNRS configurations to use. One or more of the following may apply: the associated PNRS configuration for a downlink data channel may be indicated; or the associated PNRS configuration for a control channel may be determined.

The associated PNRS configuration for a downlink data channel may be indicated one or more of following: an associated DCI that may be used to schedule the PDSCH; a location of PDSCH scheduled, for example, the time and/or frequency location of the scheduled PDSCH may determine the associated PNRS configuration; a location of DL control channel search space wherein the associated DCI is received (for example, a DL control channel search space (SS) may be partitioned, each partitioned DL control channel search space may be associated with a PNRS configuration, and/or, if a WTRU received a DCI in a certain partitioned DL control channel search space, the WTRU may know which PNRS configuration to use; or an RNTI used for the associated DCI may determine the associated PNRS configuration, for example, one or more RNTI may be used for a DCI and each RNTI may be associated with a specific PNRS configuration.

Figure 15:
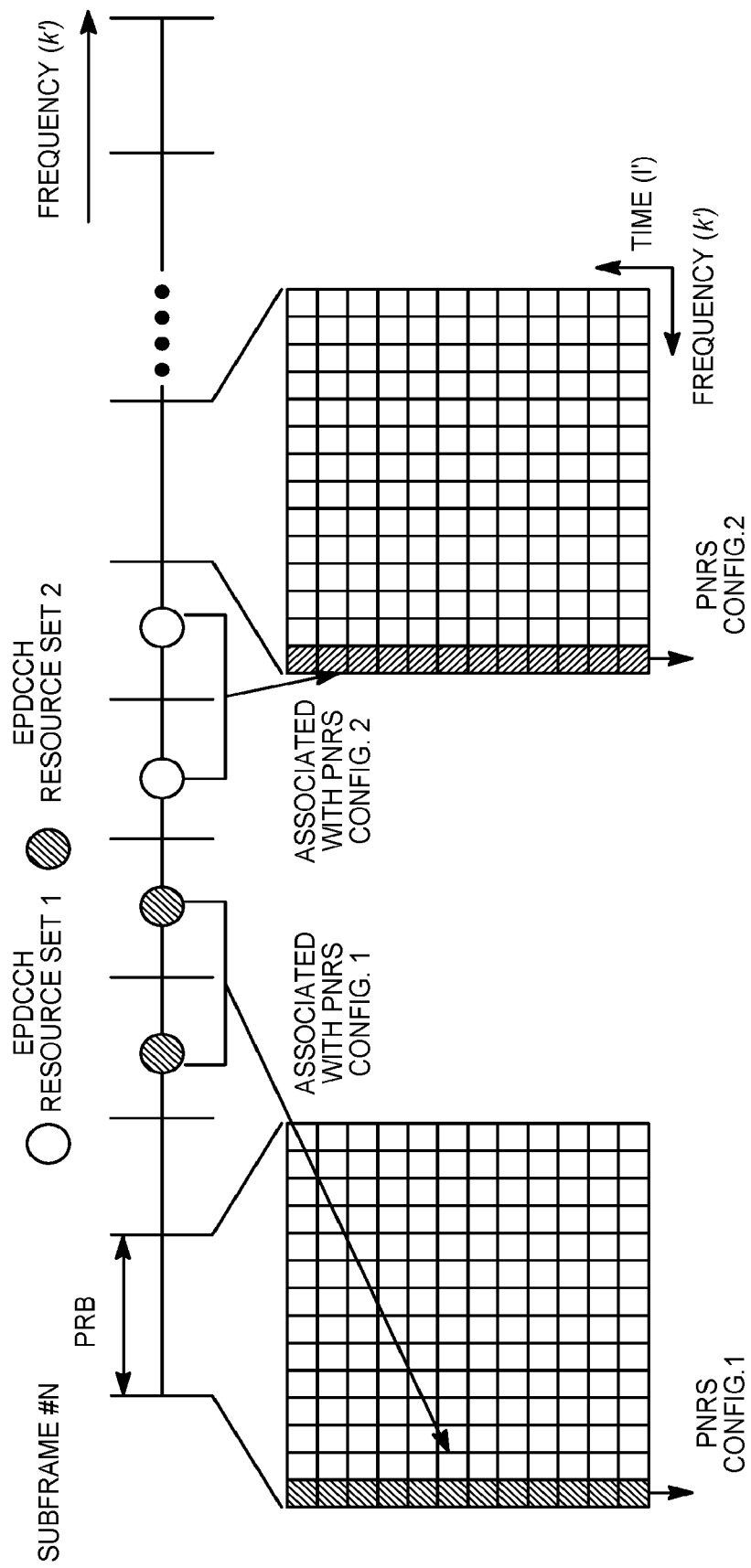
FIG. 15 illustrates an example of PNRS and EPDCCH resource set association.

The associated PNRS configuration for a control channel may be determined based on one or more of following. A DL control search space (SS) may be partitioned and each partition of the DL control SS may be associated with a specific PNRS configuration. A WTRU may use the associated PNRS configuration for a partitioned DL control SS, e.g., when the WTRU monitors the partitioned DL control SS. The associated PNRS for each partition of DL control SS may be predetermined, configured, or signalled. One or more DL control decoding candidates may be monitored in a DL control SS and (e.g., each) DL control decoding candidate(s) may be associated with a specific PNRS configuration. The associated PNRS for (e.g., each) DL control decoding candidate(s) may be predetermined, configured, or signalled. Time and/or frequency resources used for the DL control channel. For example, a first time/frequency resource for a DL control channel may be associated with a first PNRS configuration and a second time/frequency resource for a DL control channel may be associated with a second PNRS configuration. A time/frequency resource for a DL control channel may be referred to as an (E)PDCCH resource set. A (e.g., each) (E)PDCCH resource set may be associated with a specific PNRS configuration. The association between (E)PDCCH resource set and PNRS configuration may be signaled, configured, or indicated in the configuration of (E)PDCCH resource. The PNRS configuration may be preconfigured via higher layer signalling. A (e.g., each) PNRS configuration may be associated with an index. FIG. 15 illustrates an example of PNRS and EPDCCH resource set association.

One or more operation modes may be used for a demodulation of downlink signal with PNRS. For example, a WTRU may demodulate a downlink signal with phase noise compensation based on a cell-specific PNRS in a first operation mode and the WTRU may demodulate a downlink with phase noise compensation based on a WTRU-specific PNRS. If a WTRU is configured with a first operation mode, the WTRU may use a cell-specific PNRS for downlink signal demodulation, wherein the cell-specific PNRS may be located in a predetermined location. If a WTRU is configured with a second operation mode, the WTRU may use a WTRU-specific PNRS for downlink signal demodulation, wherein the WTRU-specific PNRS may be located in a scheduled downlink resource.

One or more PRBs may be used to schedule a PDSCH and the one or more PRBs may be associated with one or more PNRS configurations. In an example, each PRB may contain its associated PNRS, and a WTRU may use the PNRS. The PNRS may be used for phase noise compensation. A separate reference signal for demodulation may be transmitted. For example, a first reference signal (e.g., PNRS) may be used to estimate phase noise and a second reference signal (e.g., DM-RS) may be used to estimate channel; the estimated phase noise and/or estimated channel may be used to demodulate downlink signal. The number of antenna ports for PNRS and the number of antenna ports for DM-RS may be different. For example, a single antenna port may be used for PNRS irrespective of the transmission rank (e.g., number of layers for a downlink signal transmission), and, the number of antenna ports for DM-RS may be determined based on the transmission rank (e.g., number of layers for the associated downlink transmission). The number of PRBs associated with a PNRS configuration may be indicated, determined, or configured, e.g., via higher layer signaling. For example, a WTRU may be configured that 3 PRBs may be associated with a PNRS; the WTRU may assume that a PNRS may be transmitted in at least one of 3 PRBs associated with the same PNRS; the WTRU may assume that a PNRS may be transmitted in a subset of PRBs associated with the same PNRS.

Figure 16:
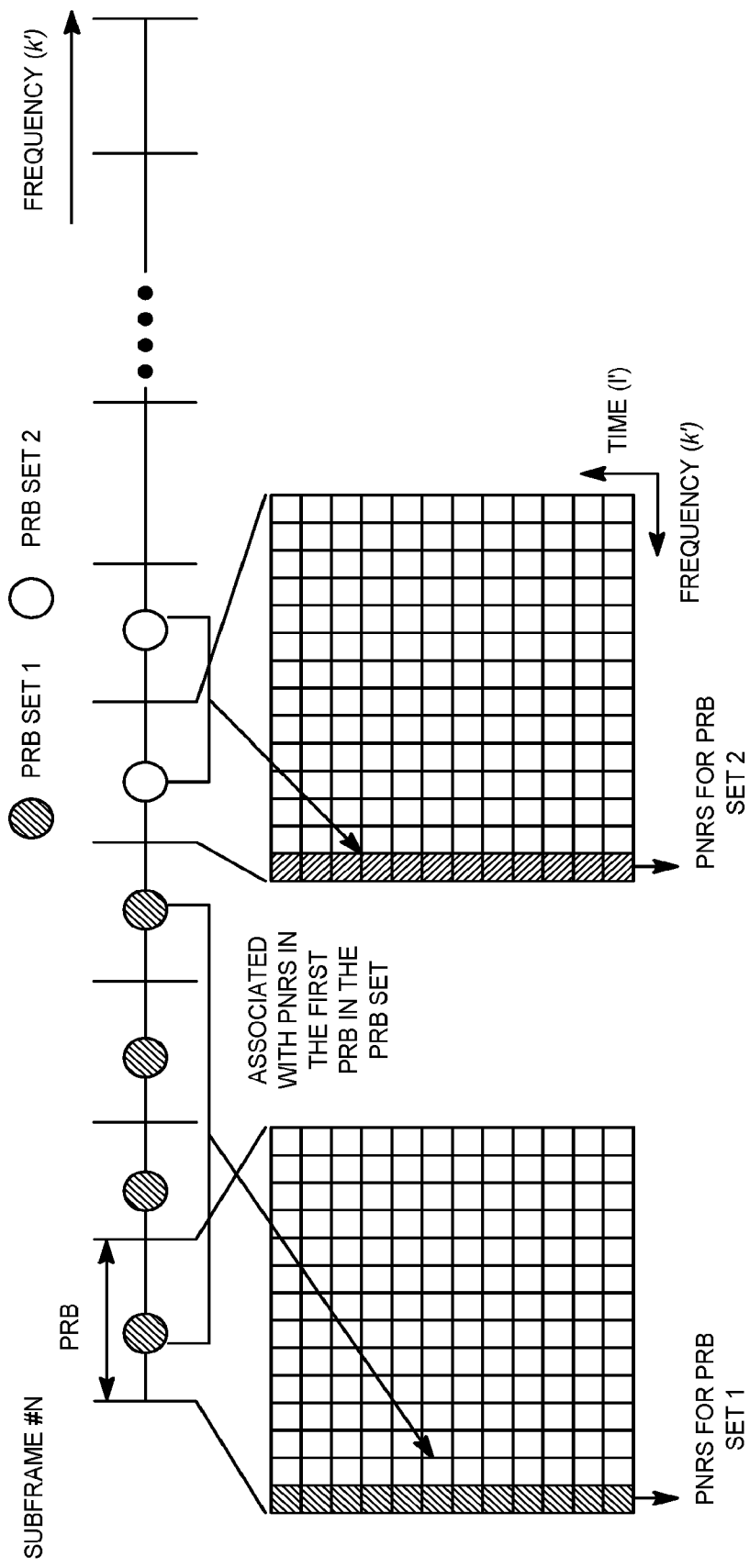
FIG. 16 illustrates an example of PNRS and PRB set association.

FIG. 16 illustrates an example of PNRS and PRB set association.

One or more PRB groups (PRG) may be used to determine the association between PRB and PNRS. A PRG may be defined as a set of consecutive PRBs in a subframe and the number PRGs in a subframe may be determined based on the total number of PRBs in a system bandwidth and the number of consecutive PRBs in a PRG. For example, if the total number of PRBs in a system bandwidth is 50 and the number of PRBs in a PRG is 5, then 10 PRGs may be used in a subframe. Each PRG may contain a PNRS. For example, a first PRB in a PRG may contain the PNRS. A WTRU may be scheduled with one or more PRBs in a subframe. The WTRU may use the PNRS located in the first PRB of the PRG for demodulation of a PRB located in the PRG. A PRG may be associated with a TRP (or cell) and (e.g., each) PRG may be associated with a specific TRP (or cell). The number of PRBs for a PRG may be configurable. The PRG size may be the same as the total number of PRBs (e.g., a single TRP is used).

The PNRS transmissions may be turned on and off dynamically by the eNB. A WTRU may request the transmission of PNRS. The PNRS transmissions may be WTRU-specific or common. When it is common, the time/frequency resources reserved for its transmissions may be configured by the eNB. When it is WTRU-specific, the eNB may signal the WTRU of the PNRS transmission.

PNRS for UL transmission may be disclosed. A WTRU may be configured for PNRS transmissions in UL, for example to allow the eNB to perform phase tracking to correct for the WTRU transmitter phase noise.

For the PNRS configuration of the UL transmissions, one or more of the following may apply: the presence or use of a PNRS may be determined; the density of a PNRS (e.g., one subcarrier, two subcarrier, etc.) may be determined; the UL PNRS may be transmitted in one or more subcarriers within a scheduled uplink resources (e.g., PRBs); the UL PNRS may be transmitted in one or more sub-carriers of an OFDM symbol (and in consecutive OFDM symbols of the RB); the index of the sub-carriers within an RB, used for UL PNRS transmissions, may be predefined; or for scheduled UL transmissions using multiple RBs, the eNB may signal to the WTRU which RB may carry the PNRS.

The presence or use of a PNRS may be determined based on an operating frequency band. For example, a UL PNRS may not be used in a lower operating frequency band (e.g., lower than 6 GHZ) and a UL PNRS may be used in a higher operating frequency band (e.g., higher than 6 GHZ). A WTRU may determine the use or transmission of a PNRS based on the operating frequency band. The use or transmission of a PNRS may be indicated from an eNB.

The density of a PNRS (e.g., one subcarrier, two subcarrier, etc.) may be determined based on one or more of following: operating frequency band; MCS level (e.g., modulation order and/or coding rate); Numerology (e.g., subcarrier spacing and/or system bandwidth); higher layer signaling, for example, the association between the PNRS density and MCS level may be determined based on a higher layer signaling, and the PNRS density for a PDSCH or PUSCH transmission may be determined based on MCS level indicated in an associated DCI; scheduled bandwidth (e.g., number of PRBs scheduled); MIMO mode of operation (e.g., SU-MIMO or MU-MIMO); and/or number of layers (e.g., transmission rank).

The UL PNRS may be transmitted in one or more subcarriers within a scheduled uplink resources (e.g., PRBs). A first PRB of a scheduled PRBs for an uplink transmission may be used to transmit a UL PNRS, wherein the first PRB may be the PRB with a lowest index within the PRBs scheduled for a WTRU. The first PRB may be the PRB with a highest index within the PRBs scheduled for a WTRU. A certain PRB of scheduled PRBs for an uplink transmission may be used to transmit an UL PNRS, wherein the certain PRB may be determined based on one or more of: predetermined location (e.g., first or last PRBs in a schedule PRBs); WTRU parameters (e.g., WTRU-ID, scrambling-ID, virtual ID), service type (e.g., URLLC, eMBB, and mMTC); or system parameters (e.g., subframe number, radio frame number, cell-ID). A first subcarrier of the first PRB in the scheduled PRBs may be used to transmit a UL PNRS. A first N subcarriers of the first PRB in the scheduled PRBs may be used to transmit an UL PNRS.

The UL PNRS may be transmitted in one or more sub-carriers of an OFDM symbol, and, in consecutive OFDM symbols of the RB. An OFDM symbol may be interchangeably used with SC-FDMA symbol, DFT-s-OFDM symbol, UW DFT-s-OFDM symbol, and ZT DFT-s-OFDM symbol.

The index of the sub-carriers within an RB, used for UL PNRS transmissions, may be predefined, e.g., it may be the center sub-carrier of the RB. One or more of following may apply for the UL PNRS subcarrier location (and/or PRB location).

For scheduled UL transmissions using multiple RBs, the eNB may signal to the WTRU which RB may carry the PNRS. Some RBs may not carry the PNRS, for example to reduce the RS overhead. The eNB may signal this information to the WTRU for example with the UL grant. One of the following may apply: RBs (e.g., all the RBs) allocated for UL transmissions are configured for PNRS; or a pattern of RBs that may be configured with PNRS may be pre-defined, e.g., the eNB may (e.g., only) need to signal to the WTRU the index of the desired pattern.

A PNRS may be used to demodulate an associated data. For example, a PNRS transmitted in a certain PRB may be used to demodulate the data in the same PRB. One or more of following may apply. A PNRS may be transmitted in one or more of PRBs scheduled for a WTRU and a WTRU (or eNB) may transmit DM-RS in (e.g., each) PRBs, which may be except for the one or more PRB containing a PNRS. The DM-RS may be signaled based on a first reference signal pattern (e.g., distributed within a PRB). The PNRS may be signaled based on a second reference signal pattern (e.g., localized within a PRB). The DM-RS locations in the one or more PRBs containing a PNRS may be used for data transmission. The DM-RS may be transmitted in the one or more PRBs containing a PNRS, e.g., if the transmission rank (e.g., number layers) for data is higher than 1. A PNRS may be transmitted in one or more of PRBs scheduled for a WTRU, and, a WTRU (or eNB) may transmit different types of DM-RS based on the presence of a PNRS in a PRB. For example, if a scheduled PRB contains a PNRS a first type of DM-RS may be used, otherwise a second type of DM-RS may be used. The reference signal pattern of first type of DM-RS may be different form that of the second type of DM-RS. The first type of DM-RS may have a lower density (e.g., smaller number of REs) than the second type of DM-RS.

The eNB may estimate the rate of change of the transmitter phase noise (for example based on eNB phase offset measurements using the default PNRS setting), and may configure the WTRU for an alternate PNRS pattern, for example a lower density pattern (e.g., as illustrated in FIG. 4).

Data demodulation reference signal (DM-RS) transmission is disclosed. In some frame structures, the DM-RS may be transmitted at the beginning of the frame/sub-frame/packet, e.g., before the data transmissions starts. If no DM-RS is transmitted in the OFDM symbols carrying data, channel estimation accuracy may suffer, e.g., especially in high mobility scenarios.

Figure 17:
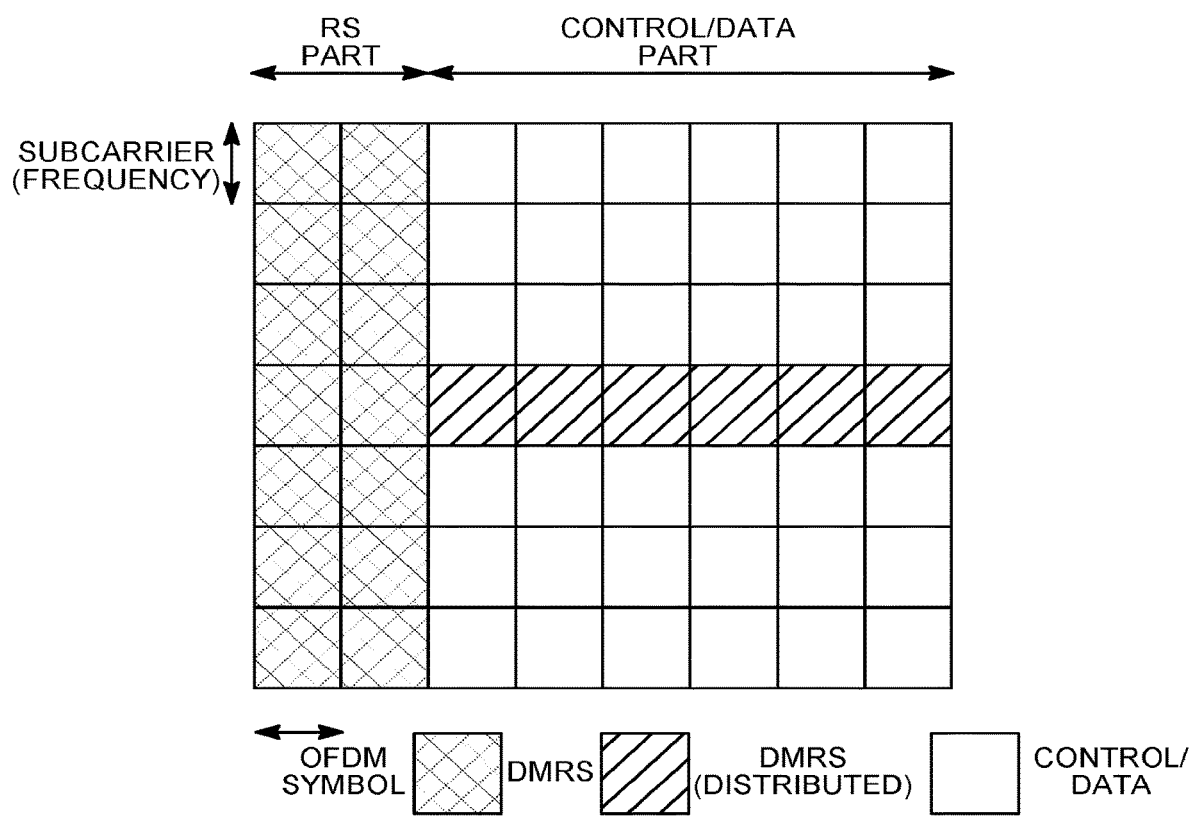
FIG. 17 illustrates an example of distributed DM-RS mapped to the control/data part of the sub-frame.

Distributed DM-RS symbols may be mapped to the data part of the frame/sub-frame/packet, e.g., in addition to the DM-RS symbols at the beginning of the sub-frame, which may be for both DL and UL transmissions, e.g., to mitigate the degradation of the channel estimates due to high mobility. FIG. 17 illustrates an example of distributed DM-RS mapped to the control/data part of the sub-frame. The distributed DM-RS may be dynamically signaled or semi-statically configured by the eNB.

The distributed DM-RS may be mapped to the data part of the sub-frame with a higher or lower density of reference signals, for example as a function of mobility: for higher mobility scenarios, a higher density pattern may be used (for example as shown in FIG. 17), while for low to medium mobility, a lower density pattern may be used.

The type of distributed DM-RS pattern may be dynamically configured by the eNB. For example, several distributed DM-RS patterns may be defined, for example: "None," "Low Density," and/or "High Density." For DL transmissions, the pattern type may be signaled by the eNB to the WTRU within the control channel, e.g., in the DCI, and the pattern may be applied for the DL assignment associated to that DCI. For UL transmissions, the pattern type may be dynamically configured by the eNB via the DL control channel. In this case, the WTRU may apply the pattern to the transmission (e.g., sub-frame/TTI) indicated by the UL grant.

For the DL and the UL transmissions, the configured DM-RS pattern may be cell-specific, or WTRU specific.

When distributed DM-RS is enabled, some of the time/frequency resources may need to be taken from the data transmissions and allocated to DM-RS transmission. The transport block size may be kept constant, e.g., regardless of the type of distributed DM-RS pattern configured: to account for the different number of available resource elements (REs), and/or rate matching patterns may be defined to be associated to each distributed DM-RS pattern type. For example, when configured for a high density distributed DM-RS pattern type, the WTRU may select the corresponding rate matching pattern to apply (e.g., for the signaled TBS). The rate matching pattern may be kept the same, e.g., regardless of the DM-RS pattern type, and different sets of transport block sizes may be defined, associated to each distributed DM-RS pattern type. Based on the selected DM-RS pattern type, the corresponding TBS table may be used.

For systems using Non-Orthogonal Multiple Access (NOMA), whereby a number of WTRUs may be assigned for transmission in the same time/frequency resources, the same distributed DM-RS pattern type may be configured for WTRUs (e.g., all WTRUs) in the same NOMA group, for example to prevent data-RS collisions. The WTRUs in that NOMA group may be configured with the same distributed DM-RS pattern type via individual signaling of WTRU specific DM-RS pattern, or using a group ID (such as a group RNTI) to simultaneously configure WTRUs (e.g., all WTRUs) in the group.

PNRS and DM-RS may be associated. One or more DM-RS ports may be used for a PDSCH or a PUSCH transmission. The number of DM-RS ports used for a PDSCH or a PUSCH transmission may be determined based on the number of layers used, allocated, or determined for a PDSCH or a PUSCH transmission, wherein the number of layers may be referred to as a transmission rank. One or more of following may apply: the number of layers for a PDSCH or a PUSCH transmission may be indicated in an associated DCI; the presence and/or PNRS density may be determined based on the number of layers indicated for a PDSCH or a PUSCH transmission; the presence and/or PNRS density may be determined based on one or more scheduling parameters not including the number of layers; and/or the number of PNRS ports (or PNRS density) may be determined based on the number of codewords used, scheduled, or determined for a WTRU.

The number of layers for a PDSCH or a PUSCH transmission may be indicated in an associated DCI. The set of DM-RS ports may be determined based on one or more of the number of layers, an indication of MU-MIMO operation, an indication of a set of DM-RS ports associated with the number of layers, or an indication a set of DM-RS ports. The number of OFDM symbols used for DM-RS may be determined based on the number of layers indicated.

The presence and/or PNRS density may be determined based on the number of layers indicated for a PDSCH or a PUSCH transmission. For example, one or more of following may apply. A single PNRS port may be transmitted or used if the number of layers is lower than a predefined threshold; more than one PNRS port may be transmitted or used if the number of layer is higher than the predefined threshold. The number of PNRS ports may be transmitted or used as the number of DM-RS ports; one-to-one mapping between PNRS ports and DM-RS ports, wherein the DM-RS port and the PNRS port mapped may be considered as quasi-collocated (QCL-ed) in terms of at least one of QCL parameters (e.g., delay spread, Doppler spread, frequency shift, average receive power, spatial Rx parameters, etc.).

The presence and/or PNRS density may be determined based on one or more scheduling parameters not including the number of layers. A single PNRS port may be transmitted or used. The PNRS port may be associated (or QCL-ed) with a certain DM-RS port. The DM-RS port associated with the PNRS may be predefined, predetermined, or indicated in the associated DCI. For example, the first DM-RS port within the set of DM-RS ports used for a WTRU may be associated with the PNRS.

The number of PNRS ports (or PNRS density) may be determined based on the number of codewords used, scheduled, or determined for a WTRU. For example, a single PNRS port may be used if a WTRU is scheduled with a single codeword while two PNRS ports may be used if a WTRU is scheduled with two codewords. The number of codewords may be determined based on the number of layers indicated in the DCI. The number of codewords may be determined based on the number of DCIs a WTRU may receive. For example, a WTRU may receive one or more DCIs and each DCI may be associated with a codeword. The presence and/or density of PNRS of each codeword may be determined based on one or more of the scheduling parameters of each codeword. A WTRU may receive two DCIs for PDSCH transmission, and a DCI may be associated with a codeword and includes scheduling parameters of each codeword. The presence and/or density of the PNRS for each codeword may be determined based on one or more of MCS level selected, the number of PRBs scheduled, number of layers, and DM-RS density of each codeword. PNRS presence and/or density (including zero density) for a codeword may be determined based on the QCL status between DM-RSs of one or more codewords. For example, DM-RSs of the codewords scheduled are QCL-ed, PNRS may be transmitted in a subset of codewords (e.g., a single codeword only includes PNRS); while if DM-RSs of scheduled codewords are non-QCL-ed, the PNRS presence and/or density may be determined based on the associated DCI or scheduling parameter of codeword.

In examples, one or more PNRS may be transmitted or received and a (e.g., each) PNRS may be associated with a DM-RS port. A PNRS pattern may be used in an PRB (or PRB-pair) and all or subset of scheduled PRBs may include the PNRS pattern. A PNRS (or a PNRS pattern, a PNRS port) in an PRB may be associated (or QCL-ed) with a DM-RS port or a set of DM-RS ports, which DM-RS port or a set of DM-RS ports associated with the PNRS in an PRB may be determined based on one or more of following: the number of layers (or the number of DM-RS ports); the number of PRBs scheduled (or a scheduled bandwidth); the number of PNRS ports (or the number of subcarriers used for PNRS within an PRB); and/or the PRB index or PRB location (n-th PRB) within the scheduled PRB.

A UCI may be transmitted on PUSCH with or without data. The UCI may include at least one of channel state information (e.g., CQI, PMI, RI, and CRI, etc.) and HARQ-ACK information (e.g., ACK or NACK). One or more channel state information (CSI) types may be used. A CSI type may be associated with a CSI parameter. A CSI parameter may include one or more of, a CQI (channel quality indicator), a wideband CQI, a subband CQI, a CQI for a first codeword, and/or a CQI for a second codeword, a PMI (precoding matrix indicator), a wideband PMI, a subband PMI, a PMI for a first component codebook (e.g., i1), a PMI for a second component codebook (e.g., i2); a multi-component codebook structure W1W2, (e.g., W1 may be the first component codebook and W2 may be the second component codebook), a CRI (e.g., CSI-RS resource indicator), a RI (rank indicator) and/or a PTI (precoding type indicator).

One or more HARQ-ACK information types may be used. A HARQ-ACK information type may be associated with a number of HARQ-ACK bits and/or codeblock groups (CBGs). For example, a HARQ-ACK information type may be associated with a single bit HARQ-ACK. A HARQ-ACK information type may be associated with a two bit HARQ-ACK. A HARQ-ACK information type may be associated with codeblock groups (CBGs). A HARQ-ACK information type may be associated with a transport block. A transport block may have one or more CBGs.

One or more UCI parts may be used. A UCI part may include one or more CSI types and/or HARQ-ACK information type. A UCI may be coded separately and transmitted simultaneously. A first UCI part may include one or more CSI types. The first UCI part may have a constant payload size irrespective of values that may be determined for the one or more CSI types. For example, CRI, RI, PTI, and a CQI for a first codeword may be a first UCI part. A second UCI part may include one or more CSI types. The second UCI part may have a variable payload size that may be dependent on one or more CSI values in the first UCI part. For example, PMIs and CQIs of a second codeword may be a second UCI part and its payload size may be determined based on RI value of the first UCI part. A third UCI part may include one or more HARQ-ACK information types.

One or more PTRS patterns and/or PTRS types may be used. A PTRS pattern and/or PTRS type for a PUSCH transmission may be determined based on at least one of a number of REs required for a UCI transmission or a specific UCI part transmitted.

A PTRS pattern and/or PTRS type for a PUSCH transmission may be determined based on the number of REs required for a UCI transmission (Nre). For example, if Nre is smaller than a predefined threshold (a), a first PTRS pattern may be used; otherwise, a second PTRS pattern may be used. More than one threshold may be used with multiple PTRS patterns. Nre may be associated with a specific UCI part. For example, the Nre may be counted only for a subset of UCI parts (e.g., a first UCI part or a third UCI part). A PTRS pattern may be determined based on the ratio between available REs for a PUSCH transmission (e.g., Npusch) and Nre. For example, if the ratio of Nre/Npusch is less than a predefined threshold, a first PTRS pattern may be used; otherwise, a second PTRS pattern may be used. The ratio may be determined based on Nre/Npusch or Npusch/Nre. Npusch may be a number of available REs for PUSCH transmission. The available REs may not include one or more of reference signal (e.g., DM-RS and SRS), and UCI Res. Npusch may be a nominal number of REs. The nominal number of REs may be determined based on the scheduled bandwidth and/or TTI length (or slot length).

Table 1 shows an example of PTRS pattern determination based on at least one of Nre or Nre/Npusch. PTRS pattern determination may be based on a required number of REs for UCI (Nre) and/or ratio between Nre and the number of available REs for a PUSCH transmission.

TABLE 1

| PTRS pattern | Nre | Nre/Npusch |
|---|---|---|
| PTRS pattern-1 | $Nre \leq \alpha_1$ | $Nre/Npusch \leq \alpha_1$ |
| PTRS pattern-2 | $\alpha_1 < Nre \leq \alpha_2$ | $\alpha_1 < Nre/Npusch \leq \alpha_2$ |
| ... | ... | ... |
| PTRS pattern-N | $\alpha_{N-1} < Nre \leq \alpha_N$ | $\alpha_{N-1} < Nre/Npusch \leq \alpha_N$ |

A PTRS pattern and/or PTRS type for a PUSCH transmission may be determined based a specific UCI part transmitted. For example, a first PTRS pattern may be used if a first UCI part and/or a second UCI part are transmitted on PUSCH; a second PTRS pattern may be used if a third UCI part is transmitted on PUSCH. A PTRS pattern may be different when a set of UCI parts transmitted on PUSCH. A PTRS pattern may be determined based on whether UCI includes HARQ-ACK information type or not. For example, a first PTRS pattern may be used if HARQ-ACK information type is not included in the UCI, otherwise a second PTRS pattern may be used for a PUSCH transmission. A PTRS pattern and/or PTRS type for a PUSCH transmission may be determined based on presence of UCI in the PUSCH transmission. For example, a first PTRS pattern (e.g., a first PTRS density) may be used if a UCI is present on a PUSCH transmission and a second PTRS pattern (e.g., a second PTRS density) may be used if no UCI is present on a PUSCH transmission.

Table 2 shows an example of PTRS pattern determination based on which UCI part is transmitted on PUSCH. PTRS pattern determination may be based on presence of one or more UCI parts in PUSCH.

TABLE 2

| PTRS pattern | UCI part 1 in PUSCH? | UCI part 2 in PUSCH? | UCI part 3 in PUSCH? |
| --- | --- | --- | --- |
| PTRS pattern-1 | No | No | No |
| PTRS pattern-2 | Yes | Yes | No |
| ... | ... | ... | ... |
| PTRS pattern-N | Yes | Yes | Yes |

Sounding reference signal (SRS) transmission is disclosed. Sounding reference signal (SRS) transmission may include one or more of the following: Sub-band SRS or SRS Transmission and RE Muting for SRS.

Figure 18:
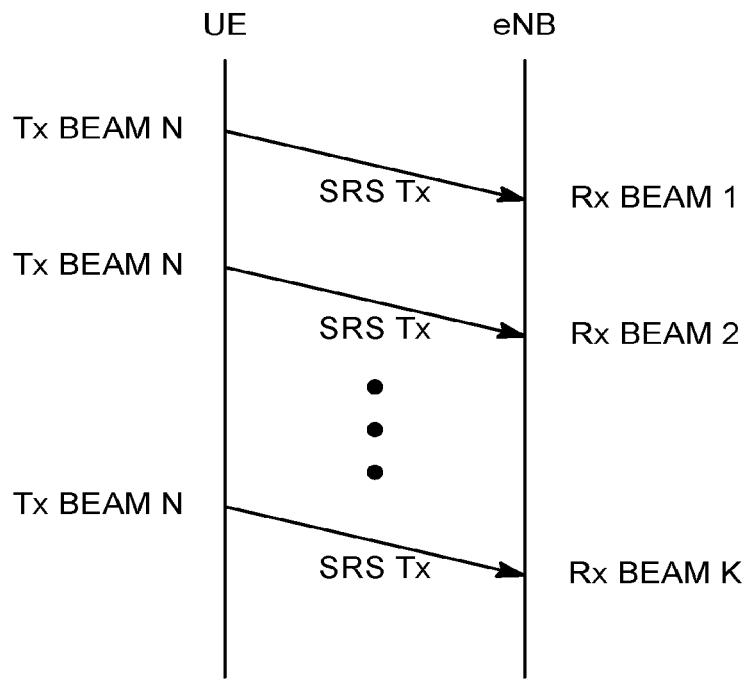
FIG. 18 illustrates an example of a WTRU transmitting the same SRS while the eNB is sweeping its receive beam.
Figure 19:
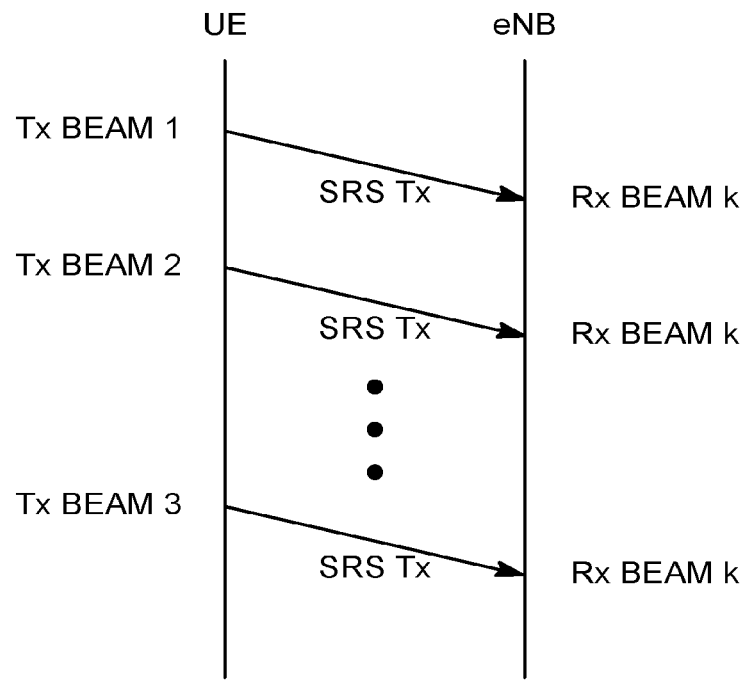
FIG. 19 illustrates an example of the WTRU sweeping its SRS.
Figure 20:
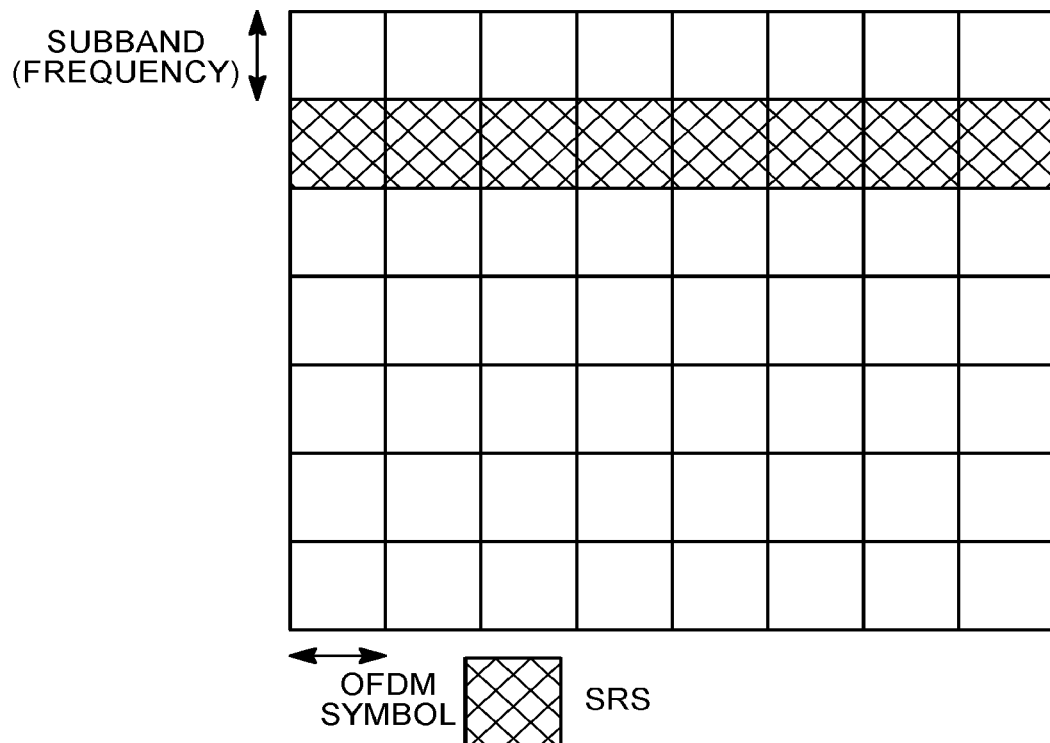
FIG. 20 illustrates an example of SRS transmission for beam measurement.
Figure 21:
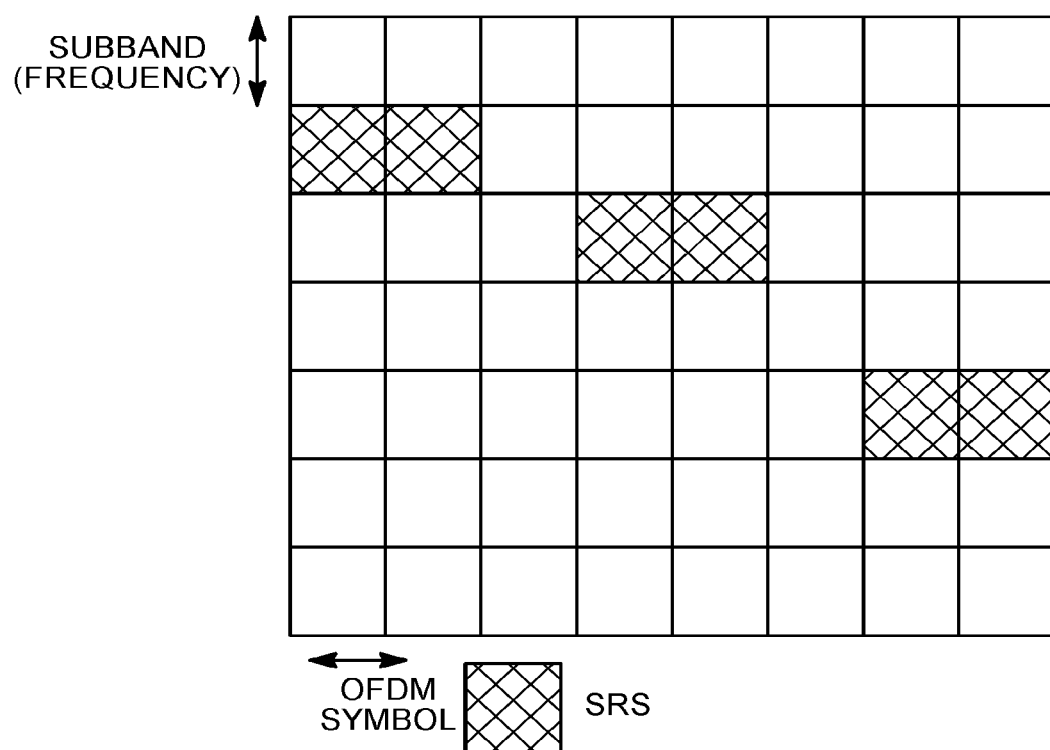
FIG. 21 illustrates an example of SRS transmission with subband hopping.

FIGS. 18&19 illustrate an example of Tx/Rx beam sweeping based on SRS. FIG. 20 illustrates an example of SRS transmission for beam measurement. FIG. 21 illustrates an example of SRS transmission with subband hopping.

Sub-band SRS is disclosed. Since the same waveform may be used for DL and UL (e.g., in NR), a common design for CSI-RS and SRS may be beneficial. Sounding reference signals may be used for channel quality estimation and/or beam measurement. Since the number of transmitter and receiver beams to be measured may be multiple, a multi-shot SRS transmission may be used. Multi-shot may mean that SRSs (e.g., a set of SRSs) are transmitted over a set of OFDM symbols that may be consecutive OFDM symbols and/or that may follow a sequence or pattern in time (and/or frequency) that may be configured, determined and/or known. The SRS transmitted in each of the OFDM symbols may be the same or different. As an example, in FIG. 18, the WTRU is transmitting the same SRS while the eNB is sweeping its receive beam, and, FIG. 19 the WTRU is sweeping its SRS, e.g., the WTRU is sweeping the beam it uses for the transmission of SRS.

The sequence or pattern may be configured or determined in terms of at least one of a symbol or symbols, a slot (e.g., a timeslot) or slots and/or a mini-slot or mini-slots. The sequence or pattern may be a function of a burst time, e.g., a beam or synchronization signal burst time, a time window (e.g., a beam time window), or a time block (e.g., beam time block). The burst time, time block, or time window may be an amount of time (e.g., continuous amount of time). The burst time, time block, or time window may be an amount of time (e.g., continuous amount of time) during which a beam direction may be used for transmission or reception. For example, a direction may not change during a burst time, time window, or time block, possibly excluding a transition time at the beginning and/or end of the burst time, time window, or time block.

In an example, a WTRU may transmit a multi-shot SRS. A multi-shot SRS may be a set of SRSs transmitted in one or more symbols in each of a set of burst times, time windows, or time blocks. The transmission may be according to configuration that may be provided by a eNB ((e.g., gNB) eNB and gNB may be used interchangeably) or other network entity.

A WTRU may not be able to transmit the SRS over the whole band, e.g., due to the power limitation. It may be preferable for a WTRU to transmit SRS over a subband in a given time interval and time-multiplex the transmission of SRS over different subbands. As an example, in FIG. 20, the SRS is transmitted on the same subband to enable beam measurement while in FIG. 21 the SRS is transmitted on different subbands to sound a larger bandwidth.

A beam measurement reference signal (BRS) may be configured to be a special case of CSI-RS for downlink and SRS for uplink. For example, the BRS may be configured to be a CSI-RS or SRS to be transmitted on a specific antenna port. The resource allocation for the BRS (and/or SRS) may define a time and/or frequency resource allocation and may be configured by the eNB.

SRS transmission and RE muting for SRS is disclosed. A resource element (RE) may be or may correspond to a time and/or frequency resource or a set of time and/or frequency resources. For example, a RE may be or may correspond to a set of symbols (e.g., one or more symbols) and a set of frequencies or sub-carriers (e.g., N frequencies or subcarriers). The frequencies or subcarriers may be a subset of frequencies or subcarriers within a transmission band or bandwidth.

SRS may be transmitted, e.g., by a WTRU, in a set of REs that may be distributed across a system bandwidth or across a sub-band of a system bandwidth. SRS may be transmitted in one or more symbols that may or may not be adjacent in time. In an example, an RE may correspond to one symbol and N subcarriers. An SRS may be transmitted in a set of REs where the REs in which to transmit may be configured.

For example, a WTRU may receive a configuration of one or more, e.g., S, RE sets, in which SRS may be transmitted by the WTRU (e.g., first WTRU) and/or another WTRU (e.g., second WTRU). The configuration for a set of REs may include identification of a set of REs in a band or sub-band. The configuration for a set of REs may include identification of a set of REs in a part of a band or sub-band that may be repeated in the band or sub-band.

At least one of the following may be configured or indicated (e.g., a WTRU may receive a configuration or indication for at least one of the following): a set of S REs sets; an RE set that may be used for SRS transmission, for example in a time period (e.g., subframe or TTI) such as a current or upcoming time period; a number of symbols (e.g., consecutive symbols) in which an SRS (e.g., multi-shot SRS) may be transmitted (e.g., the number of symbols may be configured for one or more sets (e.g., for a set (e.g., individually for each set) or once for all sets or a subset of the sets)); a spacing (e.g., in time or symbols) between symbols for multi-shot transmission; a spacing in burst times, time blocks, or time windows between SRS transmissions or sets of SRS transmissions; a pattern of burst times, time blocks or time windows for SRS transmission, for example that may enable the WTRU to determine the burst times, time blocks, and/or time windows during which to transmit SRS (e.g., to transmit SRS in one or more symbols); or whether or not to change (e.g., sweep) and/or how often to change its transmission beam or direction during an SRS transmission (e.g., during a multi-shot SRS transmission).

Subframe may be used herein as an example of a time unit. Another unit may be used and still be consistent with this disclosure. For example, in the examples described herein, slot (e.g., timeslot) or mini-slot may be substituted for subframe and still be consistent with this disclosure.

An RE set may be configured with a periodicity.

A configuration or indication may be provided (e.g., by an eNB) and/or received (e.g., by a WTRU) semi-statically, (e.g., via higher layer signaling such as RRC signaling) or dynamically, for example by physical layer signaling such as in DL control information (DCI) or with a grant such as an UL grant.

A WTRU may receive an indication (e.g., a trigger) to transmit SRS, for example dynamically. The indication may be referred to herein as an SRS-trigger. The SRS-trigger may be provided (e.g., by an eNB) and/or received (e.g., by a WTRU) for example in or with an UL grant. The SRS-trigger may be received in DL control information (DCI), for example in a DCI format that may be or may include an UL grant. A WTRU may transmit SRS based on the receipt of the SRS-trigger. The WTRU may transmit SRS in the time period (e.g., subframe or TTI) in which the WTRU may transmit an UL channel (e.g., PUSCH) for which the grant was received.

A WTRU may receive an indication of at least one set of REs on which to transmit SRS. The indication of a set may identify which set among S configured sets to use. The WTRU may transmit SRS on an RE set, for example based on receipt of an SRS-trigger and of an RE set on which to transmit SRS. The WTRU may transmit the SRS in the configured or indicated symbols.

In an example, a WTRU may receive a configuration of S RE sets. The WTRU may receive an SRS-trigger, for example in or with an UL grant, and a configuration or indication to transmit SRS using one or more RE sets that may be a subset of the S RE sets. The indication may identify the RE sets by index or other identifier with respect to the S RE sets. The indication may identify the RE sets explicitly.

The WTRU may receive an UL grant and/or SRS-trigger in time period n. The WTRU may transmit a PUSCH and/or an SRS in time period n+k, for example based on receipt of the UL grant and/or SRS-trigger in time period n. The WTRU may transmit the SRS on the one or more RE sets, for example when transmitting the SRS in time period n+k. The WTRU may transmit the SRS on the one or more RE sets in multiple symbols (or other time periods), for example when multi-shot SRS is used. A hopping pattern may be used such that a first set of RE sets may be used for SRS transmission in a first symbol or other time period and a second set of REs may be used for SRS transmission in a second symbol or other time period, for example when multi-shot SRS transmission is used. The delay from receiving an SRS-trigger to SRS transmission and the delay from receiving an UL grant to PUSCH transmission may be the same or different.

When transmitting (e.g., a signal or channel) in a time period in which an SRS is transmitted, a WTRU may mute its transmission in the REs that may be used for the SRS transmission. The WTRU may mute its transmission by rate matching around the REs that are used for the SRS transmission.

A WTRU may rate match around REs that are used for SRS, for example in a symbol. For example, when a WTRU transmits (e.g., a channel or signal) in a symbol that is used for SRS by that WTRU or another WTRU, the WTRU may rate match its transmission around the REs that are used for SRS. For example, a WTRU may rate match a data channel (e.g., PUSCH) transmission or a control channel (e.g., PUCCH) transmission around REs that are used for SRS transmission. PUSCH and PUCCH may be used as examples of channels that a WTRU may transmit. Another channel(s) may be used consistent with this disclosure.

A WTRU may rate match around the REs in an RE set that the WTRU may use for SRS transmission. In an example, a WTRU may transmit a PUSCH and an SRS in a same time period, for example when a WTRU receives an UL grant and an SRS-trigger together. When transmitting the PUSCH, the WTRU may rate match around the one or more sets of REs it uses for the SRS transmission.

To rate match (e.g., rate match a transmission) around a set of REs may mean to not map coded bits (e.g., of the transmission) to the set of REs. For example, when mapping coded bits of a PUSCH to the REs in a time period, the WTRU may skip over the REs that are used for SRS transmission (e.g., that the WTRU or another WTRU may use for SRS transmission) in that time period. A time period may, for example, be a symbol or subframe.

A first WTRU may receive configuration of one or more RE sets that a second WTRU may use for SRS transmission in a time period. The configuration may be provided in or with an UL grant that is received by the first WTRU. The configuration may be provided, for example, in DL control information (DCI) or a DL control channel. The DCI or DL control information may be separate from the DCI or DL control channel for the first WTRU's UL grant.

A first WTRU may rate match around the REs in an RE set that a second WTRU may use for SRS transmission. A configuration or indication of the RE set that may be used for SRS transmission by the second WTRU may be provided to and/or received by the first WTRU, for example in, with, and/or separately from an UL grant for the first WTRU.

In an example, a first WTRU may receive an UL grant to transmit a PUSCH in a time period. The WTRU may receive an indication that at least a second WTRU may transmit SRS in the same time period. The WTRU may receive a configuration or indication of a set of REs on which at least a second WTRU may transmit SRS. When transmitting the PUSCH, the WTRU may rate match around the REs that may be used by at least the second WTRU for SRS.

The number of bits that may be transmitted per RE may affect the power a WTRU may need or use to transmit a channel or signal such as PUSCH, for example to achieve a certain or desired performance. The number of REs available for a transmission may affect the power the WTRU may need or use.

A first WTRU may determine or adjust its transmit power for a channel or signal (e.g., PUSCH, PUCCH, SRS, transmit power) or a set of channels and/or signals based on the REs available for the transmission. A WTRU may determine the number of available REs and set or adjust the power based on at least the number of available REs.

One or more of the following REs may be considered (e.g., by a first WTRU) as unavailable REs (e.g., in a time period), for example when determining the available REs for a transmission (e.g., in a time period) and/or when determining the power for the transmission (e.g., in the time period): REs that may be used for SRS transmission; REs that may be used for DMRS, e.g., by the first WTRU; or REs that may be used for UL control information (UCI) transmission, for example when the transmission of the UCI may be piggybacked on a PUSCH transmission.

A RE or set of REs that may be considered unavailable by a first WTRU may be an RE or set of REs that may be used by the first WTRU or the second WTRU, e.g., for another channel or signal.

The WTRU may determine a power independent of available REs if the number of unavailable REs is below a threshold, e.g., that may be configured.

When determining SRS power, the determination may be based on at least the number of RES that may be used for the SRS transmission.

A WTRU may be configured with semi-persistent scheduling (SPS), for example for an UL transmission. SPS may provide a WTRU with a grant or allocation for resources in the UL that it may use over multiple periods of time (e.g., multiple slots or subframes), for example without receiving an additional grant (e.g., for new data). In some of those time periods, at least some of the resources used or allocated for the SPS transmission may be used by a WTRU (e.g., another WTRU) for SRS.

Figure 22:
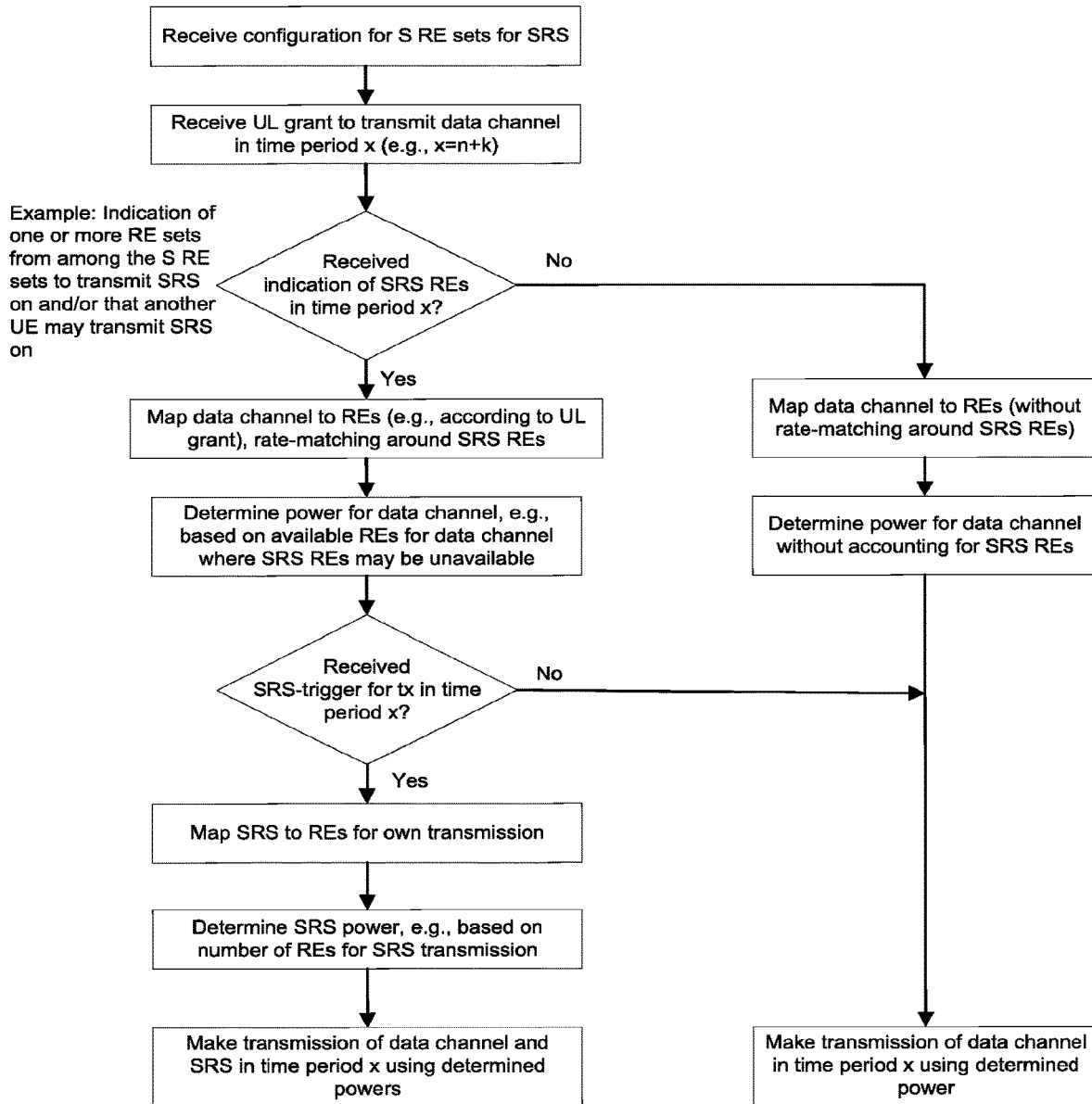
FIG. 22 illustrates an example of SRS transmission and RE muting.

An example of SRS transmission and RE muting is shown in FIG. 22. A first WTRU may receive an SRS configuration that may be used for SRS transmission by the first WTRU or a second WTRU.

The first WTRU may receive an indication that indicates when another (e.g., a second) WTRU may transmit SRS, for example according to an SRS configuration such as an SRS configuration described herein. The SRS configuration may, for example, provide a set or sets of symbols and/or REs. The SRS configuration may, for example, provide a time and/or frequency pattern.

The first WTRU may transmit in the UL (e.g., an UL data channel such as PUSCH). The first WTRU may mute (e.g., blank) and/or rate match around one or more REs and/or or symbols in which another WTRU may transmit SRS, for example according to a configuration, e.g., SRS configuration, the first WTRU may receive.

The first WTRU may receive an indication that may indicate when the SRS configuration, muting, and/or rate matching may be active and/or not active. The first WTRU may receive an indication that may indicate when it should perform the muting or rate matching and/or not perform the muting and/or rate matching. The indication may be received in at least one of RRC signaling, MAC signaling, or physical layer signaling.

The SRS configuration, muting, and/or rate-matching may be activated and/or deactivated, e.g., based on a received indication. The SRS configuration, muting, and/or rate matching may be for a specific UL transmission (e.g., of an SPS configuration), a duration, a time window, and/or until deactivated. A specific UL transmission, duration, and/or time window, may be relative to when the activation request is received, for example specific to time unit n+k for an activation request received in time unit n.

Activation/deactivation may be used to represent activation and/or deactivation. Enabled and activated may be used interchangeably. Disabled and deactivated may be used interchangeably.

In examples, activation/deactivation of an SRS configuration, muting, and/or or rate matching may be provided in a MAC-CE. In examples, activation/deactivation of an SRS configuration, muting, and/or or rate matching may be provided in physical layer signaling such as in a DCI format that may be scrambled (e.g., that may have its CRC scrambled) with a C-RNTI (e.g., SPS C-RNTI), e.g., that may be configured for and/or associated with the SPS configuration or transmission.

A WTRU may mute and/or rate match around one or more resources (e.g., REs and/or symbols) based on or in response to receipt of an activation or indication for at least one of an SRS configuration, resource muting, and/or SRS rate matching around.

Semi-persistent SRS may be provided.

A WTRU may and/or may be configured to transmit SRS, e.g., multi-shot SRS. A WTRU may receive a configuration for SRS transmission. A WTRU may receive an activation and/or deactivation for SRS transmission.

A WTRU may transmit SRS, for example according to at least a received configuration. A WTRU may transmit, e.g., begin transmitting, SRS in response to receiving an SRS activation. A WTRU may not transmit, e.g., may stop transmitting SRS, in response to receiving an SRS deactivation.

In an example an SRS activation and/or SRS deactivation may be provided and/or received in a MAC Control Element (e.g., MAC-CE).

A MAC-CE may be received in a PDSCH. A WTRU that mis-detects a MAC-CE to deactivate SRS transmission may continue transmitting SRS until the gNB recognizes the mis-detection and sends another deactivation, e.g., that may be successfully received by the WTRU that deactivates SRS transmission.

A WTRU may be configured with a time window or other parameter that may limit the number of SRS transmissions and/or the time during which the WTRU may transmit SRS, for example to ensure SRS deactivation when a deactivation request may be missed.

In an example, the WTRU may be configured with a duration parameter, e.g., D, for SRS transmission. The WTRU may receive an activation request, for example in a DCI or MAC-CE. The WTRU may transmit SRS until the WTRU successfully receives a deactivation request. The WTRU may transmit SRS until a time (e.g., timer) expires where the time is based on D. In examples, the WTRU may transmit SRS until it has made D (or a function of D) SRS transmissions or sets of SRS transmissions, for example since receipt of an activation. The WTRU may stop SRS transmission after D (or a function of D) SRS transmissions. In examples, the WTRU may stop SRS transmission after D time (or a function of D time), for example since receipt of an activation. D may be in time units such as symbols, slots, mini-slots, subframes, frames, time bursts, time blocks, and the like.

The starting point from which to determine the time window or the number of transmissions may be the time or time unit (e.g., subframe, slot, mini-slot, etc.) in which the SRS activation (e.g., the last or most recent SRS activation) is transmitted (e.g., by the gNB) and/or received (e.g., by the WTRU).

For example, a WTRU may receive an SRS activation in time unit (e.g., subframe, slot, or mini-slot) n. A WTRU may begin transmitting SRS in time unit n+k. The SRS in time unit n+k may be considered the first SRS transmission for counting SRS transmissions. Time unit n or n+k may be considered the starting time (e.g., time 0) for counting time since receipt of activation.

The WTRU may restart its counting (e.g., of transmissions or time) when the WTRU receives an activation (e.g., re-activation) request before it stops SRS transmission that may have been initiated by a previous activation request. A WTRU may ignore an activation (e.g., re-activation) that it may receive before it stops SRS transmission that may have been initiated by a previous activation request, for example to avoid the possibility of continuing transmission due to a misinterpretation of deactivation as activation.

The duration parameter, which may be a maximum time window, may be configured by broadcast or WTRU specific signaling. For example, the parameter may be provided by RRC signaling. In examples, the parameter may be included in a MAC-CE such as the MAC-CE that provides the activation and/or deactivation.

In an example, there may be a set of duration parameters and the configuration may indicate which of the duration parameters in the set to use. One of the duration parameters may indicate infinity or always which may, for example correspond to and/or result in the WTRU using deactivation, e.g., only a deactivation request, to stop SRS transmission after SRS transmission is activated.

In examples, deactivation may be indicated, e.g., in the MAC-CE or DCI, by a certain duration parameter (e.g., activation duration parameter) such as 0.

In an example, a WTRU may be activated (e.g., to transmit SRS) with a duration parameter such as infinity or always that may indicate to the WTRU to transmit SRS (e.g., according to a configuration that may have been previously received) until receipt of a deactivation. The WTRU may transmit SRS in response to the activation. The WTRU may be activated or deactivated with a duration parameter such as 0 that may indicate to stop transmitting SRS. The WTRU may stop transmitting SRS in response to the activation or deactivation.

Demodulation Reference Signal (DM-RS) transmission may be provided. For example, DM-RS sequences may be mapped to interleaved subcarriers. The DM-RS sequences associated with different antenna ports may be multplixed by using orthogonal sequences (e.g., one for each antenna port) and/or spreading over adjacent OFDM symbols using time domain orthogonal cover codes (TD-OCC).

For example, one or more DM-RS configurations may be used, wherein a DM-RS configuration may be determined based on one or more of following: number of subcarriers used in an OFDM symbol or a DFT-s-OFDM symbol; orthogonal cover code (OCC) in time domain or frequency domain; number of cyclic shift of a DM-RS sequence; and/or number of symbols (e.g., OFDM symbols or DFT-s-OFDM symbols) used for DM-RS.

A number of subcarriers used in an OFDM symbol or a DFT-s-OFDM symbol may be used to determine the DM-RS configuration. For example, a subset of subcarriers within a PRB may be used and the subset of subcarriers may be located uniformly within a PRB. For example, a PRB may have 12 subcarriers in an OFDM symbol or a DFT-s-OFDM symbol; a first configuration may use 6 subcarriers out of 12 subcarriers and may be located every 2nd subcarrier (e.g., even-numbered subcarrier or odd-numbered subcarrier); a second configuration may use 4 subcarriers out of 12 subcarriers and may be located every 3rd subcarrier. A subset of subcarriers within a PRB may be used and the subset of subcarriers may be located non-uniformly within a PRB.

Orthogonal cover code (OCC) in time domain or frequency domain may be used to determine the DM-RS configuration. For example, OCC in time domain (TD-OCC) may be used with two consecutive subcarriers in time domain (e.g., a TD-OCC may use [1 1] and another TD-OCC may use [1-1]); OCC in frequency domain (FD-OCC) may be used with two consecutive subcarriers in frequency domain (e.g., a FD-OCC may use [1 1] and another FD-OCC may use [1-1]); a first configuration may use TD-OCC and a second configuration may use FD-OCC.

Number of cyclic shift of a DM-RS sequence may be used to determine the DM-RS configuration. For example, a first configuration may use N1 cyclic shifts and a second configuration may use N2 cyclic shift.

Combinations may be used to determine the DM-RS configuration. For example, a first DM-RS configuration may use K1 (e.g., K1=6) subcarriers within a PRB, TD-OCC, and N1 (e.g., N1=4) cyclic shifts; a second DM-RS configuration may use K2 (e.g., K2=4) subcarriers within a PRB, TD-OCC, and N2 (e.g., N2=2) cyclic shifts; a third DM-RS configuration may use K1 (e.g., K1=6) subcarriers, FD-OCC, and N3 (e.g., N3=0) cyclic shifts, etc.

A DM-RS configuration of one or more DM-RS configurations may be determined based on one or more of following: subcarrier spacing (if a subcarrier spacing is below a threshold, a first DM-RS configuration may be used (e.g., a DM-RS configuration uses TD-OCC); a second DM-RS configuration may be used (e.g., a DM-RS configuration uses FD-OCC) if a subcarrier spacing is above a threshold); carrier frequency; NR-PDCCH search space (or NR-PDCCH CORESET) (a first DM-RS configuration may be used if an associated DCI is received in a first NR-PDCCH search space (or a first NR-PDCCH CORESET) and a second DM-RS configuration may be used if an associated DCI is received in a second NR-PDCCH search space (or a second NR-PDCCH CORESET). NR-PDCCH CORESET may be referred to as a NR-PDCCH resource set.); RNTI of a received DCI (one or more RNTIs may be used for an associated DCI and a DM-RS configuration may be determined based on the RNTI used for the DCI); MIMO mode of operation (a first DM-RS configuration may be used when a WTRU is configured with a first MIMO operation mode (e.g., SU-MIMO mode) and a second DM-RS configuration may be used when a WTRU is configured with a second MIMO operation mode (e.g., MU-MIMO mode); the MIMO mode operation may be determined based on the associated DCI type); and/or mobility of a WTRU (e.g., WTRU speed).

Figure 23:
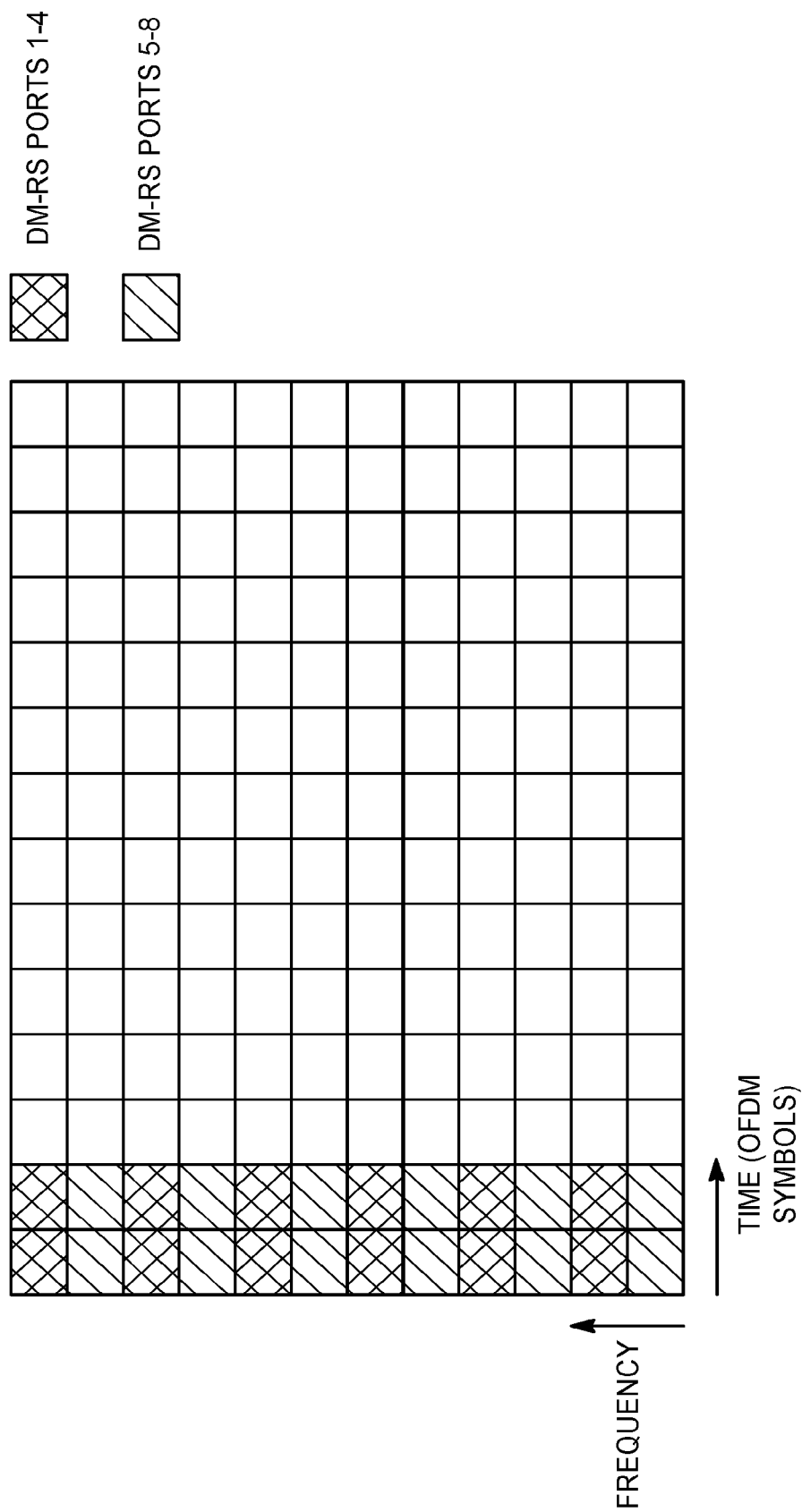
FIG. 23 illustrates an example of port multiplexing using IFDMA with orthogonal sequences and repetition.

Implicit DM-RS configuration determination for IFDMA based DM-RS may be provided. FIG. 23 illustrates an example of port multiplexing using IFDMA with orthogonal sequences and repetition. Two example configurations may be as follows.

For example, DM-RS sequence for an antenna port may be mapped to every k-th subcarrier. As an example, in FIG. 23, DM-RS sequences are mapped to every other subcarrier in an OFDM symbol. To multiplex multiple ports on the same resources, up to K different sequences may be mapped on the same subcarriers. The K sequences may be orthogonal. The same DM-RS symbols may be repeated on the adjacent OFDM symbols. This may be designated Configuration 1 for ease of explanation.

For example, DM-RS sequence for an antenna port may be mapped to every k-th subcarrier. As an example, in FIG. 23, DM-RS sequences are mapped to every other subcarrier in an OFDM symbol. To multiplex multiple ports on the same resources, up to M different sequences may be mapped on the same subcarriers. The M sequences may be orthogonal. This may be designated Configuration 2 for ease of explanation. In this option, symbols from two different DM-RS sequences may be transmitted on the same subcarrier over a number of adjacent OFDM symbols using orthogonal cover codes. For example (assuming 2 OFDM symbols), on subcarrier k, r1[1 1] and r2[1−1] may be transmitted on the two OFDM symbols, e.g., subcarrier k on the first OFDM symbol is loaded with r1+r2 and the same subcarrier on the second OFDM symbols is loaded with r1−r2. In this example, r1 and r2 may be coefficients of DM-RS sequences.

If the channel on subcarrier k changes significantly from one OFDM symbol to the other, loss of orthogonality may occur, and r1 and r2 may not be separated perfectly at the receiver. This may be due to, for example, phase noise as the phase noise may change from one OFDM symbol to the other. The impact of phase noise may be larger at higher frequencies. Similarly, high mobility may cause loss of orthogonality.

A configuration for a DM-RS transmission may be determined implicitly by at one or more of the following. Configurations may be generalized such that one configuration (Configuration 1) may be a DM-RS configuration without time domain cover spreading while another configuration (Configuration 2) may be a DM-RS configuration with time domain cover codes applied over a number of adjacent OFDM symbols.

Carrier frequency (fc): If fc≥Fc, Configuration 1 may be used and if fc<Fc Configuration 2 may be used.

Subcarrier spacing (Δf): If Δf≥F, Configuration 1 may be used and if Δf<F Configuration 2 may be used.

Speed (v): If v≥V, Configuration 1 may be used and if v<V Configuration 2 may be used.

The parameters Fc, F, V may be configured by a gNB or a network.

Implicit DM-RS configuration determination for FDMA based DM-RS may be provided. In a possible DM-RS configuration, the DM-RS ports may be multiplexed over adjacent subcarriers using frequency domain orthogonal cover codes. Two example configurations with and without time domain cover codes may be as follows.

Figure 24:
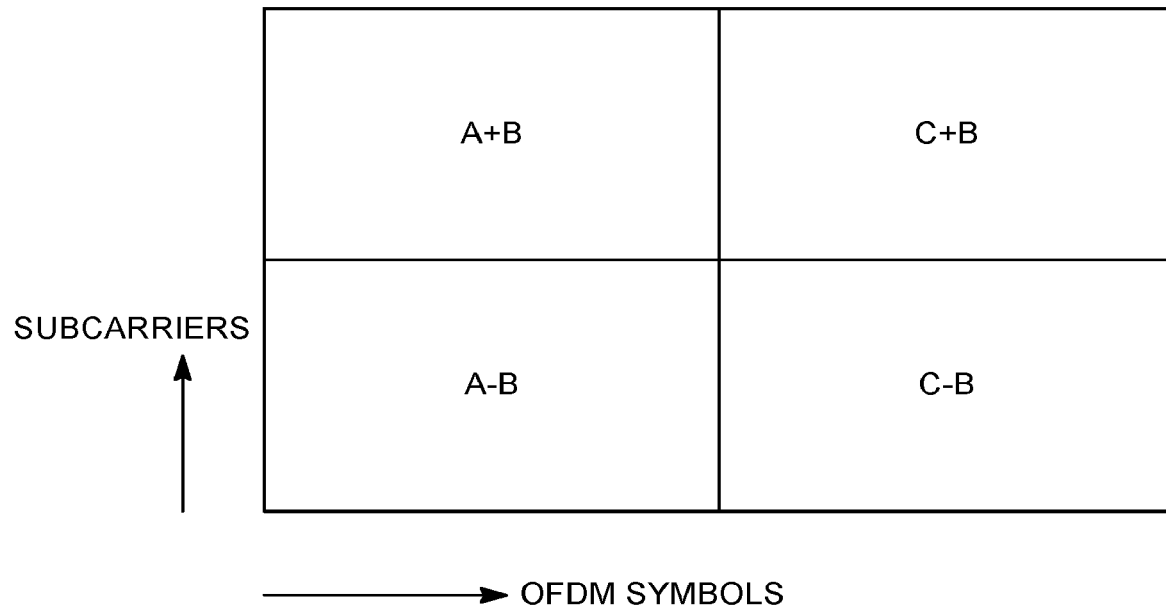
FIG. 24 illustrates an example of FDM of DM-RS symbols without time domain cover codes.

FIG. 24 illustrates an example of FDM of DM-RS symbols without time domain cover codes. DM-RS ports may be multiplexed over adjacent subcarriers using frequency domain orthogonal cover codes, for example [1 1] and [1 -1]. Adjacent OFDM symbols may be used to transmit different DM-RS symbols of different DM-RS ports. For example, if the DM-RS symbols for 4 ports are a, b, c, d, then the transmitted symbols are shown in FIG. 24. This may be designated Configuration 1 for ease of explanation.

Figure 25:
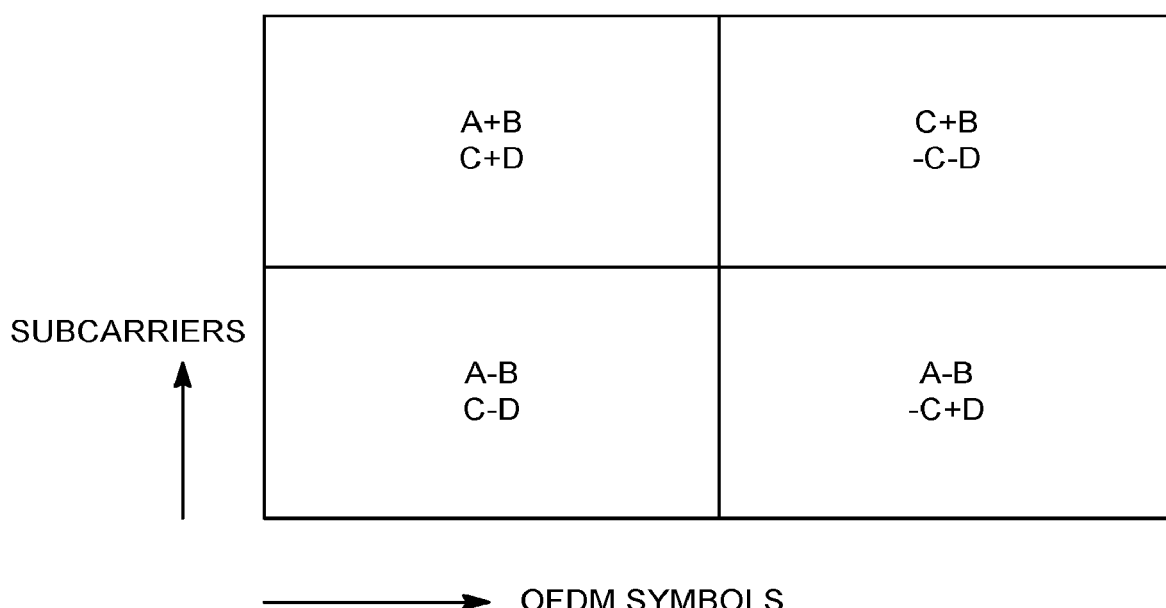
FIG. 25 illustrates an example of FDM of DM-RS symbols with time domain cover codes.

FIG. 25 illustrates an example of FDM of DM-RS symbols with time domain cover codes. DM-RS ports may be multiplexed over adjacent subcarriers using frequency domain orthogonal cover codes. On top of this, time domain cover codes may be used to spread the reference symbols over adjacent OFDM symbols. For example, if the DM-RS symbols for 4 ports are a, b, c, d, then the transmitted symbols are shown in FIG. 25. This may be designated Configuration 2 for ease of explanation.

A configuration for DM-RS transmission may be determined implicitly by one or more of the following methods. These options may be generalized such that one configuration (Configuration 1) may be a DM-RS configuration without time domain cover codes while another configuration (Configuration 2) may be a DM-RS configuration with time domain cover codes applied over a number of adjacent OFDM symbols. Carrier frequency (fc): If fc≥Fc, Configuration 1 may be used and if fc<Fc Configuration 2 may be used. Subcarrier spacing (Δf): If Δf≥F, Configuration 1 may be used and if Δf<F Configuration 2 may be used. Speed (v): If v≥V, Configuration 1 may be used and if v<V Configuration 2 may be used. The parameters Fc, F, V may be configured by a gNB or a network.

Figure 26:
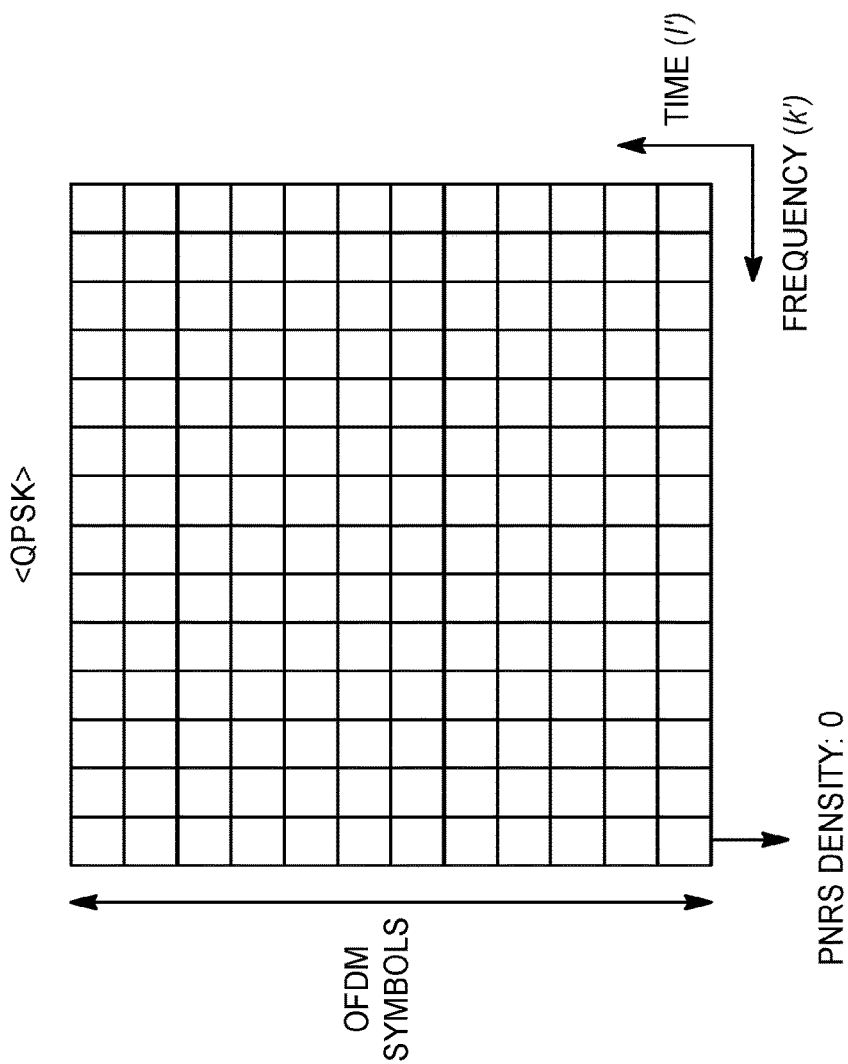
FIGS. 26 and 26A illustrate an example of PNRS frequency density.
Figure 26A:
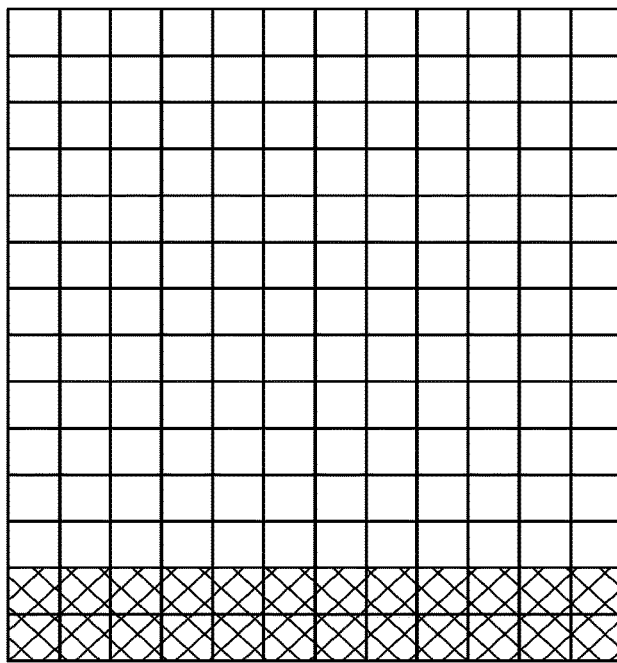
Figure 26A:
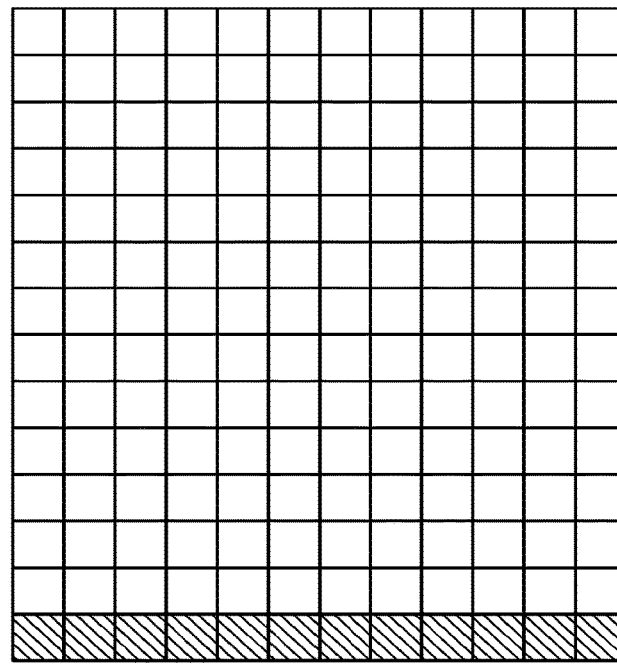

FIGS. 26 and 26A illustrate an example of PNRS frequency density for QPSK, 16QAM, and 64QAM modulation.

Figure 27:
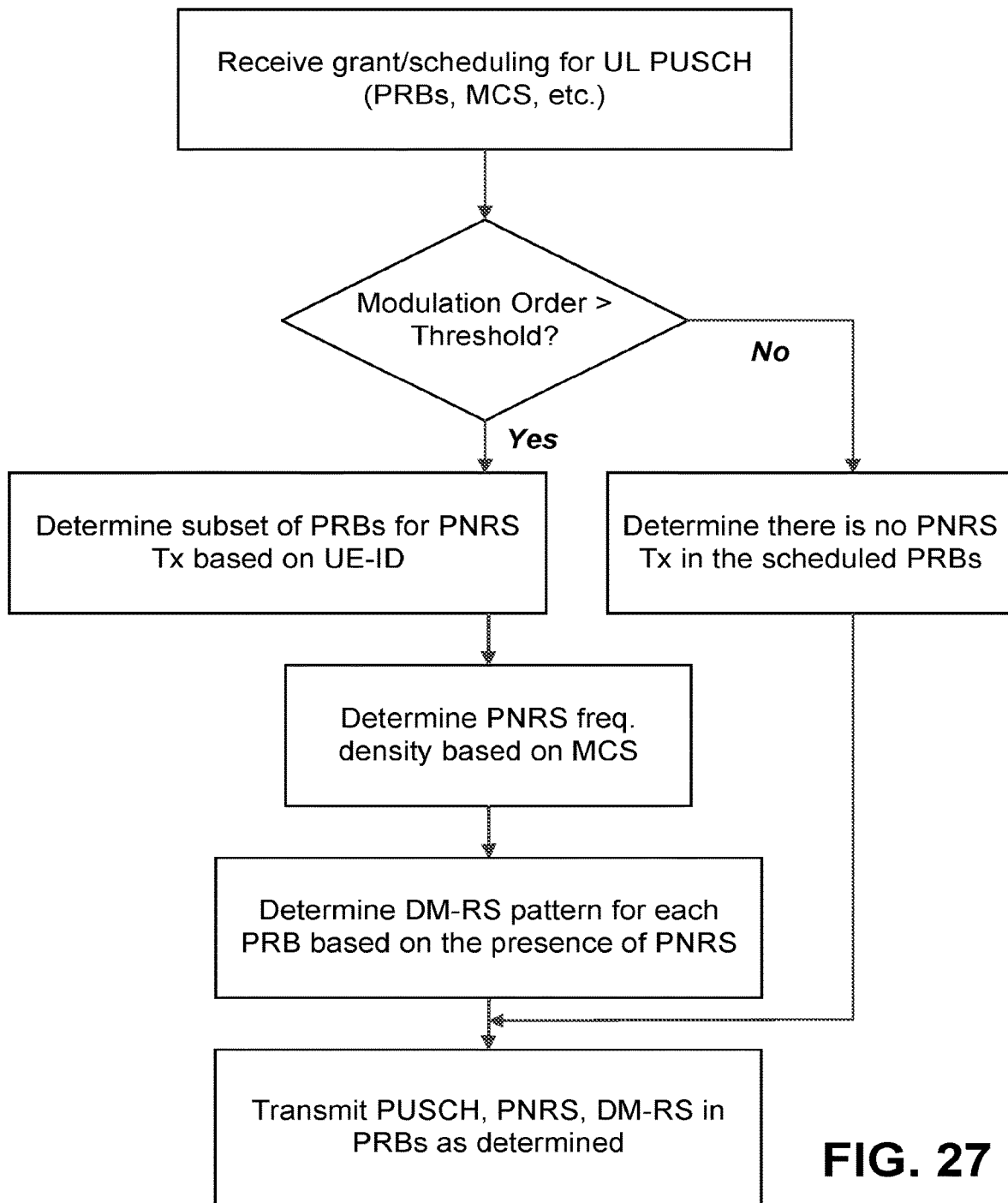
FIG. 27 illustrates an example of determining a frequency density for a PNRS transmission.

FIG. 27 illustrates an example of determining a frequency density for a PNRS transmission. A subset of PRBs for PNRS transmission may be based on a WTRU ID (for example, to randomize multi-user interference). A PNRS frequency density may be based on MCS level (e.g., a 16QAM may have a density 1 and 64QAM may have a density 2).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Although features and elements of the present specification may consider LTE, LTE-A, New Radio (NR), or 5G specific protocols, it is understood that the solutions described herein are not restricted to these scenario(s) and may be applicable to other wireless systems as well.

What is claimed is:

1. A base station comprising a processor and a memory, the processor and the memory configured to:
   send an indication to transmit one or more phase noise reference signals;
   send downlink control information (DCI) that includes an indication of a set of uplink resources for an uplink transmission and an indication of a modulation coding scheme;
   determine a phase noise reference signal (PNRS) density associated with the uplink transmission, wherein the PNRS density is determined based at least on the indicated modulation coding scheme; and
   receive the uplink transmission via the set of uplink resources, wherein the set of uplink resources comprises a first subset of the set of uplink resources that is used for reception of one or more phase noise reference signals, wherein the first subset of the set of uplink resources is comprised in a subset of a plurality of resource blocks (RBs), and wherein the subset of the plurality of RBs that comprise the first subset of the set of uplink resources is determined based on at least a wireless transmit receive unit identifier (WTRU-ID).

2. The base station of claim 1, wherein the PNRS density is a time density.

3. The base station of claim 1, wherein, if the modulation coding scheme is a first modulation coding scheme, the PNRS density is a first density, and if the modulation coding scheme is a second modulation coding scheme, the PNRS density is a second density, and wherein the first density is a higher density than the second density.

4. A method comprising:
   sending an indication to transmit one or more phase noise reference signals;
   sending downlink control information (DCI) that includes an indication of a set of uplink resources for an uplink transmission and an indication of a modulation coding scheme;
   determining a phase noise reference signal (PNRS) density associated with the uplink transmission, wherein the PNRS density is determined based at least on the indicated modulation coding scheme; and receiving the uplink transmission via the set of uplink resources, wherein the set of uplink resources comprises a first subset of the set of uplink resources that is used for reception of one or more phase noise reference signals, wherein the first subset of the set of uplink resources is comprised in a subset of a plurality of resource blocks (RBs), and wherein the subset of the plurality of RBs that comprise the first subset of the set of uplink resources is determined based on at least a wireless transmit receive unit identifier (WTRU-ID).

5. The method of claim 4, wherein the PNRS density is a time density.

6. The method of claim 4, wherein, if the modulation coding scheme is a first modulation coding scheme, the PNRS density is a first density, and if the modulation coding scheme is a second modulation coding scheme, the PNRS density is a second density, and wherein the first density is a higher density than the second density.

7. A base station comprising a processor and a memory, the processor and the memory configured to:
send an indication of a set of resources and an indication of a modulation coding scheme, the set of resources corresponding to a plurality of resource block (RBs);
determine a phase noise reference signal (PNRS) density, wherein the PNRS density is determined based at least on the indicated modulation coding scheme; and
determine a first subset of the set of resources, wherein the first subset of the set of resources are associated with one or more phase noise reference signals, wherein the first subset of the set of resources is comprised in a subset of the plurality of RBs, and the subset of the plurality of RBs that comprise the first subset of the set of resources is determined based on at least a wireless transmit receive unit identifier (WTRU-ID).

8. The base station of claim 7, wherein the PNRS density is a time density.

9. The base station of claim 7, wherein, if the modulation coding scheme is a first modulation coding scheme, the PNRS density is a first density, and if the modulation coding scheme is a second modulation coding scheme, the PNRS density is a second density, and wherein the first density is a higher density than the second density.

10. The base station of claim 7, wherein the indication of the set of resources and the indication of the modulation coding scheme are sent via downlink control information.

11. The base station of claim 10, wherein the first subset of the set of resources is associated with a physical downlink control channel (PDCCH) transmission.

12. The base station of claim 7, wherein the indication of the set of resources and the indication of the modulation coding scheme are received via scheduling information, and wherein the processor and the memory are further configured to:
determine a second subset of the set of resources, wherein the second subset of the set of resources is used for transmission of data associated with an uplink transmission; and
receive an uplink transmission via the first subset of the set of resources and the second subset of the set of resources.

13. The base station of claim 7, wherein the uplink transmission is a physical uplink shared channel (PUSCH) transmission.

14. The base station of claim 13, wherein the indicated modulation coding scheme is associated with the PUSCH transmission.

* * * * *